(12) United States Patent
Androulaki et al.

(10) Patent No.: US 10,341,121 B2
(45) Date of Patent: *Jul. 2, 2019

(54) SYSTEM, METHOD, AND COMPUTER PROGRAM PRODUCT FOR PRIVACY-PRESERVING TRANSACTION VALIDATION MECHANISMS FOR SMART CONTRACTS THAT ARE INCLUDED IN A LEDGER

(71) Applicant: International Business Machines Corporation, Armonk, NY (US)

(72) Inventors: Elli Androulaki, Zurich (CH); Angelo De Caro, Zurich (CH); Thorsten Kramp, Kilchberg (CH); Alessandro Sorniotti, Zurich (CH); Marko Vukolic, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,986

(22) Filed: Mar. 5, 2018

(65) Prior Publication Data

US 2018/0198630 A1 Jul. 12, 2018

Related U.S. Application Data

(63) Continuation of application No. 14/957,634, filed on Dec. 3, 2015, now Pat. No. 9,992,028.

(Continued)

(51) Int. Cl.
*H04L 9/32* (2006.01)
*G06Q 20/06* (2012.01)
*G06Q 20/38* (2012.01)
*H04L 9/00* (2006.01)
*H04L 9/14* (2006.01)
*H04L 9/30* (2006.01)
*H04L 29/06* (2006.01)

(Continued)

(52) U.S. Cl.
CPC ............ *H04L 9/3263* (2013.01); *G06F 21/64* (2013.01); *G06Q 20/065* (2013.01);

(Continued)

(58) Field of Classification Search
None
See application file for complete search history.

(56) References Cited

U.S. PATENT DOCUMENTS 7,549,050 B2 6/2009 Wheeler et al.
9,397,985 B1 7/2016 Seger, II et al.
(Continued)

FOREIGN PATENT DOCUMENTS

GB       1511963.9    * 7/2015   ....... G06Q 208/0658
WO       2017090041 A1   6/2017

OTHER PUBLICATIONS

Goodman, "Tezos: A Self-Amending Crypto-Ledger Position Paper", https://www.tezos.com/pdf/position_paper.pdf, Aug. 3, 2014, pp. 1-18.

(Continued)

*Primary Examiner* — Kambiz Zand
*Assistant Examiner* — Arezoo Sherkat
(74) *Attorney, Agent, or Firm* — Scully, Scott, Murphy & Presser, P.C.; Daniel Morris, Esq.

(57) ABSTRACT

The system, method, and computer program product described herein may provide the capability to handle a variety of types of transactions, not just payment transactions. In addition, system, method, and computer program product described herein may provide the capability for users to be able to control the confidentiality of their transactions, for the system to control access to transactions, for the system to be capable of auditing transactions, and to provide accountability of the validating entities.

20 Claims, 18 Drawing Sheets

Related U.S. Application Data

(60) Provisional application No. 62/260,269, filed on Nov. 26, 2015.

(51) Int. Cl.
  *G06F 21/64* (2013.01)
  *H04L 9/08* (2006.01)

(52) U.S. Cl.
  CPC ..... *G06Q 20/0658* (2013.01); *G06Q 20/3829* (2013.01); *H04L 9/006* (2013.01); *H04L 9/008* (2013.01); *H04L 9/0833* (2013.01); *H04L 9/14* (2013.01); *H04L 9/30* (2013.01); *H04L 9/3242* (2013.01); *H04L 9/3247* (2013.01); *H04L 63/0428* (2013.01); *H04L 63/06* (2013.01); *H04L 63/0823* (2013.01); *H04L 63/102* (2013.01); *H04L 63/123* (2013.01); *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 2015/0095648 A1* | 4/2015 | Nix | H04W 4/70 713/170 |
| 2015/0270969 A1 | 9/2015 | Ishizaka et al. | |
| 2015/0271183 A1 | 9/2015 | MacGregor et al. | |
| 2015/0287026 A1 | 10/2015 | Yang | |
| 2015/0332395 A1 | 11/2015 | Walker et al. | |
| 2015/0356555 A1 | 12/2015 | Pennanen | |
| 2015/0371224 A1 | 12/2015 | Lingappa | |
| 2015/0379510 A1 | 12/2015 | Smith | |
| 2016/0028552 A1 | 1/2016 | Spanos et al. | |
| 2017/0046806 A1 | 2/2017 | Haldenby et al. | |
| 2017/0140408 A1 | 5/2017 | Wuehler | |
| 2018/0204192 A1* | 7/2018 | Whaley | G06Q 20/0658 |

OTHER PUBLICATIONS

Peters et al., "Understanging Modern Banking Ledgers through Blockchain Technologies: Future of Transaction Processing and Smart Contracts on the Internet of Money", University College London—Department of Statistical Science; University of Oxford—Man Institute of Quantitative Finance; CMIS, Commonwealth Scientific and Industrial Research Organisation, University College London—Financial Computing and Analytics Group, Department of Computer Science, Nov. 18, 2015, pp. 1-33.

List of IBM Patents or Patent Applications Treated as Related dated Mar. 6, 2018, 2 pages.

* cited by examiner

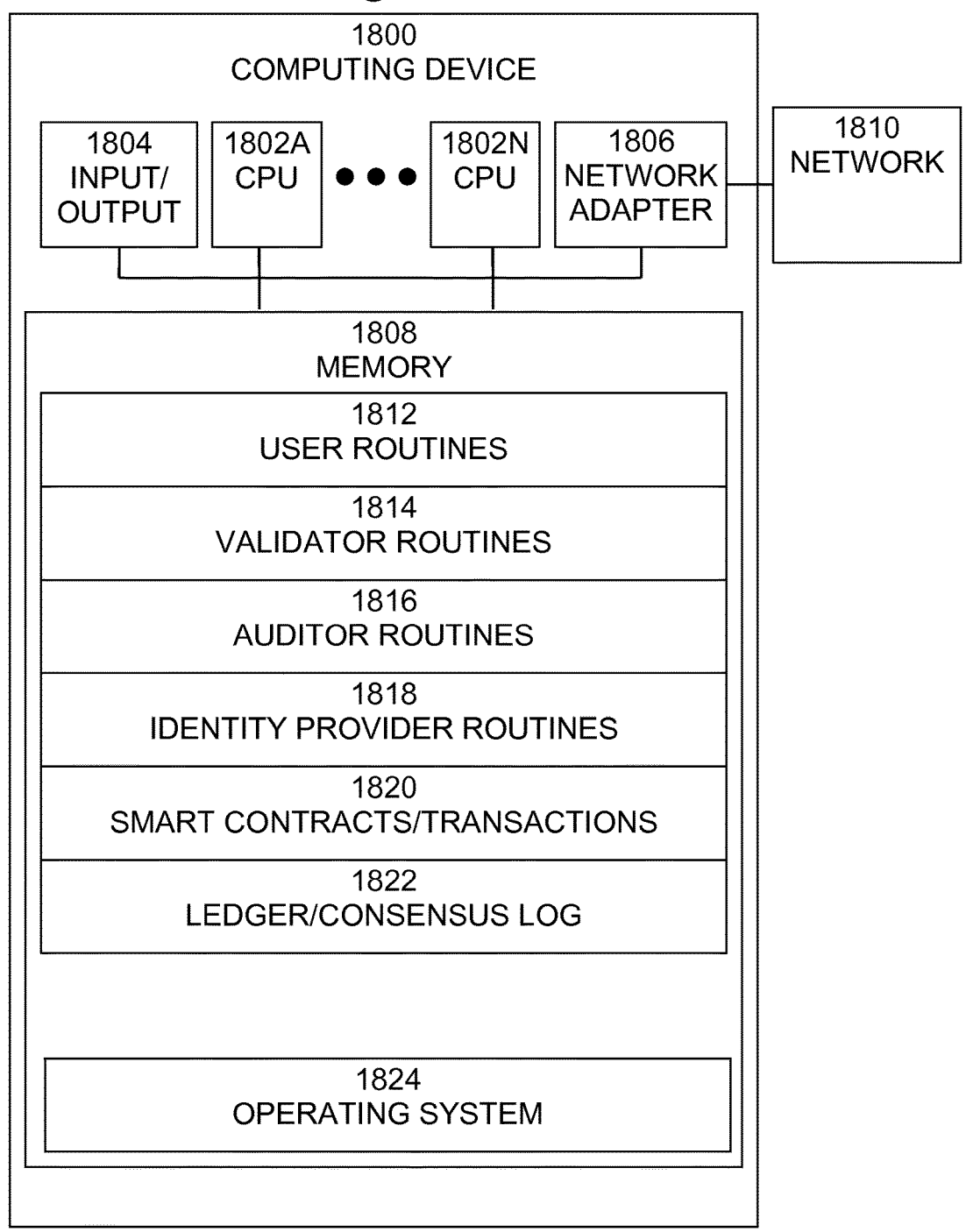

SYSTEM, METHOD, AND COMPUTER PROGRAM PRODUCT FOR PRIVACY-PRESERVING TRANSACTION VALIDATION MECHANISMS FOR SMART CONTRACTS THAT ARE INCLUDED IN A LEDGER

CROSS-REFERENCE TO RELATED APPLICATIONS

This application is a continuation of U.S. patent application Ser. No. 14/957,634, filed Dec. 3, 2015, which claims the benefit of U.S. Provisional Application Ser. No. 62/260,269, filed Nov. 26, 2015, the contents of each of which are incorporated by reference herein in their entirety.

BACKGROUND OF THE INVENTION

1. Field of the Invention

The present invention relates to a system, method, and computer program product that may provide the capability to handle a variety of types of transactions, validate transactions, provide the capability to control the execution of confidential of transactions, control access to transactions, for auditing transactions, and to provide accountability of the validating entities.

2. Description of the Related Art

A transaction ledger is a concept that was introduced in the context of decentralized payment systems, such as BITCOIN®, to denote an ordered set of transactions that have been validated or confirmed within the system up to a certain point in time. For security purposes, the ledger is supposed to include only valid transactions and, as far as these transactions are included in the ledger, it should be impossible for someone to remove it from there. BITCOIN®, and most cryptocurrencies implement a distributed ledger, comprised of the peers in the network, i.e., by having the network peers decide which transaction should be validated by means of a consensus protocol.

Recently, however, there have been attempts to provide a ledger that is built in a centralized way, i.e., having a single entity be responsible for building the ledger given a set of announced transactions. Though introduced in systems that serve payments, the ledger was developed to account for various types of transactions, aka smart contracts, where users may perform payments under certain conditions, e.g., if a particular computation is performed by the other party. One of the main benefits of a ledger in these systems is that it can be public, and the transactions in it publicly verifiable. That is, every user of the system may be able to obtain the ledger, and his/her transactions, verify that the list of transactions in the ledger are valid, and verify the correctness of the ledger itself, for example, by confirming that the entity that extends the ledger by adding more transactions to it confirms only valid transactions. The benefits of a public ledger become greater due the variety of applications that can be built on top of it through smart contracts.

Given their public nature, it is important that transactions that are added in ledgers respect the right of privacy of individuals. The programmable ledger community has worked in two different directions to enhance transaction privacy. The first is adopting pseudonymity, i.e., allowing users to generate an arbitrary number of pseudonyms and participate through them in their transactions. The second direction concerns solely payment transactions and leverages cryptographic primitives to hide the participants and the amount of the payment, though making it easy for anyone to confirm that a payment is valid. However, a need arises for systems that can handle other types of transactions, not just payment transactions. In addition, a need arises for users to be able to control the confidentiality of their transactions, for the system to control access to transactions, for the system to be capable of auditing transactions, and to provide accountability of the validating entities.

SUMMARY OF THE INVENTION

The system, method, and computer program product described herein may provide the capability to handle a variety of types of transactions, not just payment transactions. In addition, system, method, and computer program product described herein may provide the capability for users to be able to control the confidentiality of their transactions, for the system to control access to transactions, for the system to be capable of auditing transactions, and to provide accountability of the validating entities.

For example, a method of processing digital transactions in a network of computer systems may comprise creating a digital message including a specification of a set of validator computer systems to validate the computer program instructions and results of execution of the computer program instructions, wherein each validator computer system is provided with a signing key, and computer program instructions to be executed to perform at least one function relating to a digital transaction, wherein the computer program instructions are encrypted so that the computer program instructions are accessible only by the specified set of validator computer systems, signing the digital message using a user-private system key, generating a copy of the digital message for each specified validator computer system and signing the copy for each specified validator computer system with that validator computer system's public signing key, transmitting the digital messages over the network to at least the plurality of validator computer systems, and receiving a validation result from at least some of the plurality of validator computer systems, wherein a validation result is generated at a validator computer system by decrypting the signed digital message, executing the computer program instructions in the digital message to determine if the computer program instructions are valid, generating a result indicating whether the computer program instructions are valid, and signing the result with a system provided signing key and with the signing key provided in the digital message.

The method may further comprise determining that the digital message is valid if at least a threshold number of validation results indicate that the digital message is valid. The digital message may further comprise a specification of a set of user computer systems to be parties to the transaction, wherein each user computer system may be provided with a signing key, and the method may further comprise providing access to the computer program instructions only to the specified user computer systems using the signing key. The digital message may further comprise a specification of a computer program instruction execution role for each of the specified user computer systems. The specified validator computer systems may not have access to identities of the specified user computer systems. The result may further comprise a result of execution of the computer program instructions. The result may be encrypted so that only authorized parties can see the result.

As another example, a system for processing digital transactions in a network of computer systems may comprise a processor, memory accessible by the processor, and computer program instructions stored in the memory and executable by the processor to perform creating a digital message including a specification of a set of validator computer systems to validate the computer program instructions and results of execution of the computer program instructions, wherein each validator computer system is provided with a signing key, and computer program instructions to be executed to perform at least one function relating to a digital transaction, wherein the computer program instructions are encrypted so that the computer program instructions are accessible only by the specified set of validator computer systems, signing the digital message using a user-private system key, generating a copy of the digital message for each specified validator computer system and encrypting the copy for each specified validator computer system with that validator computer system's public encrypting key, transmitting the digital messages over the network to at least the plurality of validator computer systems, and receiving a validation result from at least some of the plurality of validator computer systems, wherein a validation result is generated at a validator computer system by decrypting the encrypted digital message, executing the computer program instructions in the digital message to determine if the computer program instructions are valid, generating a result indicating whether the computer program instructions are valid, (potentially encrypting the result with a key provided by a user), and signing the (encrypted) result with a system provided signing key and with the public part of the signing key provided in the digital message.

The system may further comprise computer program instructions executable for determining that the digital message is valid if at least a threshold number of validation results indicate that the digital message is valid. The digital message may further comprise a specification of a set of user computer systems to be parties to the transaction, wherein each user computer system may be provided with a signing key, and the method may further comprise providing access to the computer program instructions only to the specified user computer systems using the signing key. The digital message may further comprise a specification of a computer program instruction execution role for each of the specified user computer systems. The specified validator computer systems may not have access to identities of the specified user computer systems. The result may further comprise a result of execution of the computer program instructions. The result may be encrypted so that only authorized parties can see the result.

As another example, a computer program product for processing digital transactions in a network of computer systems may comprise a computer readable medium and computer program instructions stored on the computer readable medium and executable by a processor to perform creating a digital message including a specification of a set of validator computer systems to validate the computer program instructions and results of execution of the computer program instructions, wherein each validator computer system is provided with a signing key, and computer program instructions to be executed to perform at least one function relating to a digital transaction, wherein the computer program instructions are encrypted so that the computer program instructions are accessible only by the specified set of validator computer systems, signing the digital message using a user-private system key, generating a copy of the digital message for each specified validator computer system and encrypting the copy for each specified validator computer system with that validator computer system's public encrypting key, transmitting the digital messages over the network to at least the plurality of validator computer systems, and receiving a validation result from at least some of the plurality of validator computer systems, wherein a validation result is generated at a validator computer system by decrypting the signed digital message, executing the computer program instructions in the digital message to determine if the computer program instructions are valid, generating a result indicating whether the computer program instructions are valid, and signing the result with a system provided signing key and with the signing key provided in the digital message.

The computer program product may further comprise computer program instructions executable for determining that the digital message is valid if at least a threshold number of validation results indicate that the digital message is valid. The digital message may further comprise a specification of a set of user computer systems to be parties to the transaction, wherein each user computer system may be provided with a signing key, and the method may further comprise providing access to the computer program instructions only to the specified user computer systems using the signing key. The digital message may further comprise a specification of a computer program instruction execution role for each of the specified user computer systems. The specified validator computer systems may not have access to identities of the specified user computer systems. The result may further comprise a result of execution of the computer program instructions. The result may be encrypted so that only authorized parties can see the result.

BRIEF DESCRIPTION OF THE DRAWINGS

The details of the present invention, both as to its structure and operation, can best be understood by referring to the accompanying drawings, in which like reference numbers and designations refer to like elements.

FIG. 18 is an exemplary block diagram of a computer system in which processes involved in the system, method, and computer program product described herein may be implemented.

DETAILED DESCRIPTION OF THE INVENTION

The system, method, and computer program product described herein may provide the capability to handle other types of transactions, not just payment transactions. In addition, the system, method, and computer program product described herein may provide the capability for users to be able to control the confidentiality of their transactions, for the system to control access to transactions, for the system to be capable of auditing transactions, and to provide accountability of the validating entities.

The system, method, and computer program product described herein provides privacy-preserving transaction validation mechanisms for smart contracts that are included in a ledger. Confidentiality of the transactions is provided for any type of transaction, not just payment transactions. Each entity involved may determine whether or not wishes to reveal the full content of each transaction. For example, for a payment transaction, such information may include the payee identity, amount of payment, etc. The entity may hide any portion of, or all of, the information, including the type of the transaction, to all but a restricted number of validating entities. In the latter case, while hidden by public validators, the transaction result may still be verifiable by public validators, and may eventually be added to the ledger/system state. In addition, confidential smart contracts are not "inferable" by entities that have no access to them. In particular, invocations of contract functions are unlinkable to other entities, while the identities of the validating nodes are hidden towards the rest of the system.

The smart contract creator may provide permission only to a subset of users to invoke a function, if included in the corresponding functions access control list (ACL), and/or with specific roles, without revealing the identity of the users or linking this activity invocation with other transactions of the same user. Auditability of transactions is provided. Auditors may be able to access the plaintext of transactions. Accountability of the validating entities is also provided. Validators may be accounted for in the case of misbehavior.

The system, method, and computer program product described herein may be applied to both centralized and decentralized ledger systems, assuming that the system is permissioned, i.e., there is a single- or limited-identity provider that enables users to make use of the system.

Figure 1:
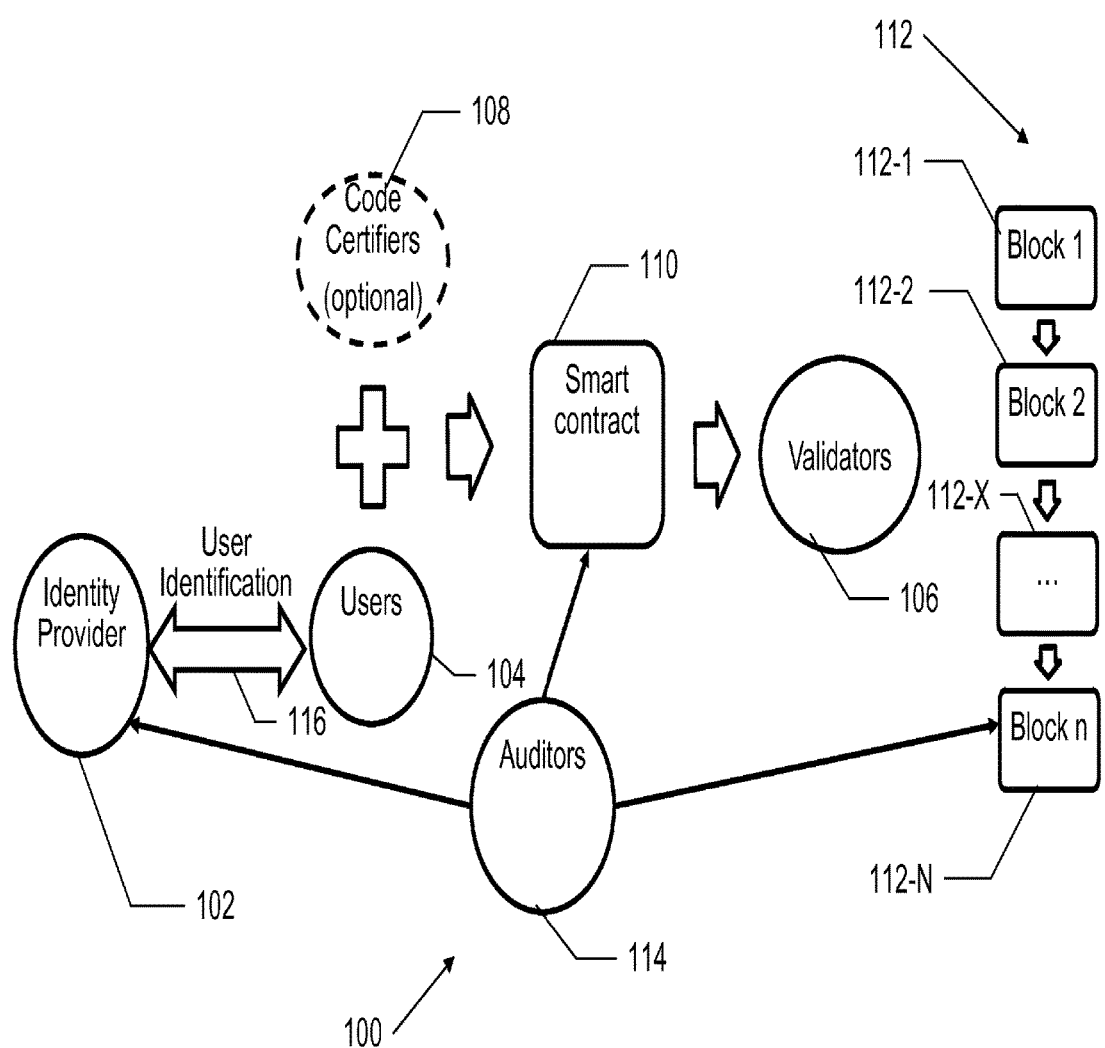
FIG. 1 is an exemplary diagram of a system in which the system, method, and computer program product described herein may implemented, along with the entities involved in Blockchain system interactions.

An example of a system 100 in which the system, method, and computer program product described herein may be implemented, along with the entities involved in Blockchain system interactions, is shown in FIG. 1. The system of FIG. 1 includes, but is not limited to, identity providers 102, end users 104, validators 106, code certifiers 108 (optional), smart contracts 110, ledger 112, and auditors 114. Identity providers 102 are typically computer systems that perform identity provisioning for the users 104 and validators 106. Users 104 are computer systems that are operated by, or on behalf of the users of the system. Users 104 may appear to create, submit, and provide input to a smart contract 110 through the system. Smart contract 110 (also referred to herein as a contract) is typically a software entity that specifies an action or function to be performed by system 100, or by connected or associated systems. A transaction then is a message for smart contract invocation from a user 104 or a validator 106. A smart contract 110 may be as simple as a payment transaction, or it may be much more complex, and include a number of executable code segments that may implement technical function or business rules. Validators 106 are typically computer systems that verify (i.e., execute) a contract, generate result information, and eventually include it in the ledger. Validators may include additional components, such as code certifiers to perform, for example, static analysis of the smart contract, and authorized (or contract) validators to perform analysis of the smart contract during execution and which may be chosen per smart contract. Ledger 112 is a record of all contracts that have been validated, whether statically or during execution. The entries in ledger 112 may be considered to form a Blockchain. For example, there may be two stages of development of a Blockchain in ledger 112. First, a Consensus Log (CL) (not shown), which is an ordered log of candidate transactions (potentially containing invalid ones) is developed. Then, validators 106 may execute transactions of the CL sequentially and the output of the validators after such execution may be entered into a ledger as blocks 112-1-112-N. Auditors are computer systems that may be able to at any point check what contracts have taken place, and their content.

Also shown in FIG. 1 is an example of users 104 registering 116 with system 100. Users 104 may provide identifying information to identity provider 102, which may verify the identity, and then provide credentials to users 104 for making use of the system 100. Typically, such credentials are in the form of encryption/signature key pairs that may be unique to each user. Validators also obtain similar credentials from identity provider 102. Further, identity provider 102 may issue anonymous certificates to users, while maintaining the mapping between users and the anonymous certificates.

Figure 2:
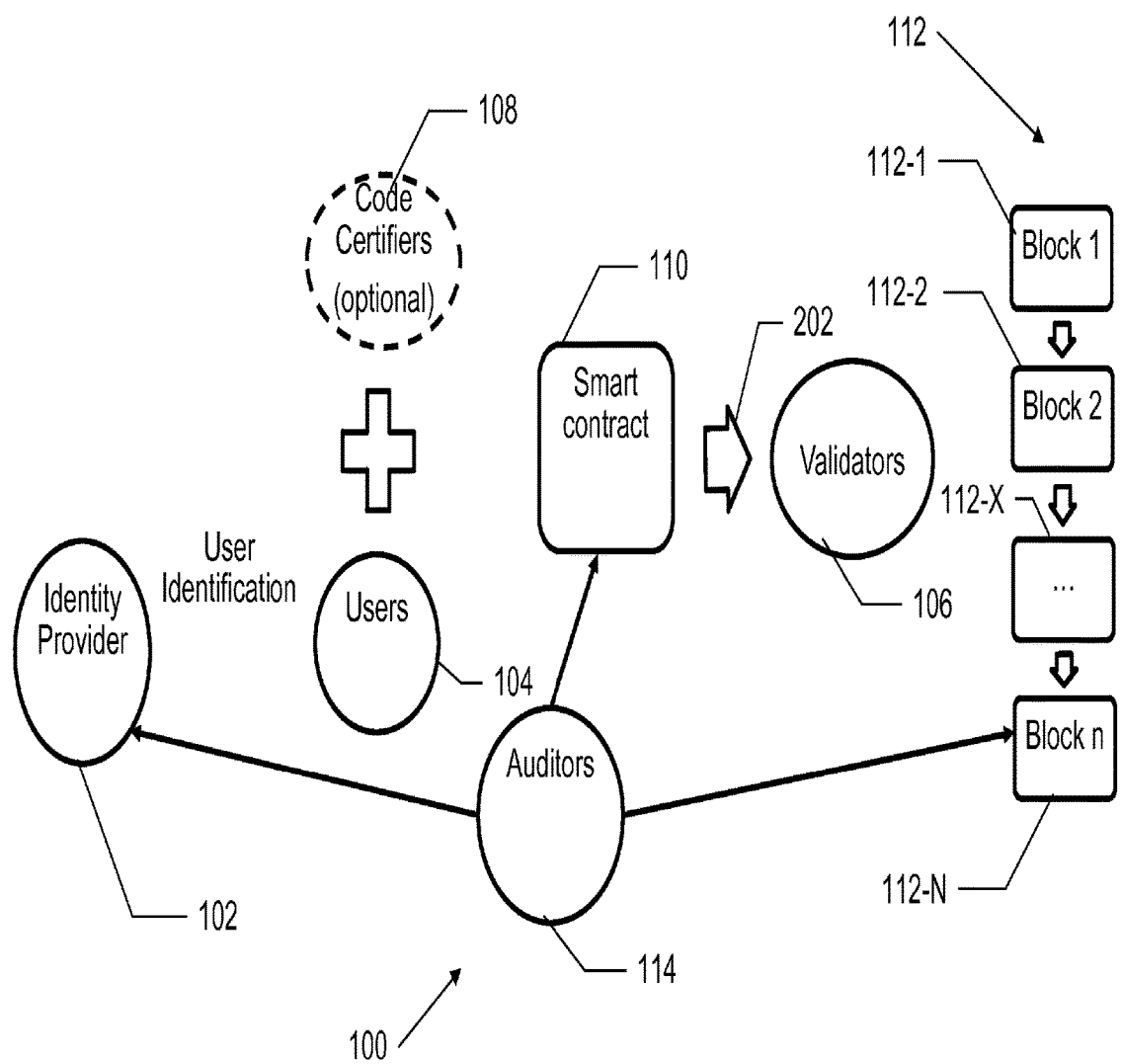
FIG. 2 is an exemplary process flow diagram of the creation of a smart contract in the system shown in FIG. 1.

FIG. 2 shows an example of the creation of a smart contract 110. User 104 may create smart contract 110 and submit it 202 for certification to validators 106. Validators perform certification by performing analyses such as static and dynamic analysis of the smart contract.

Figure 3:
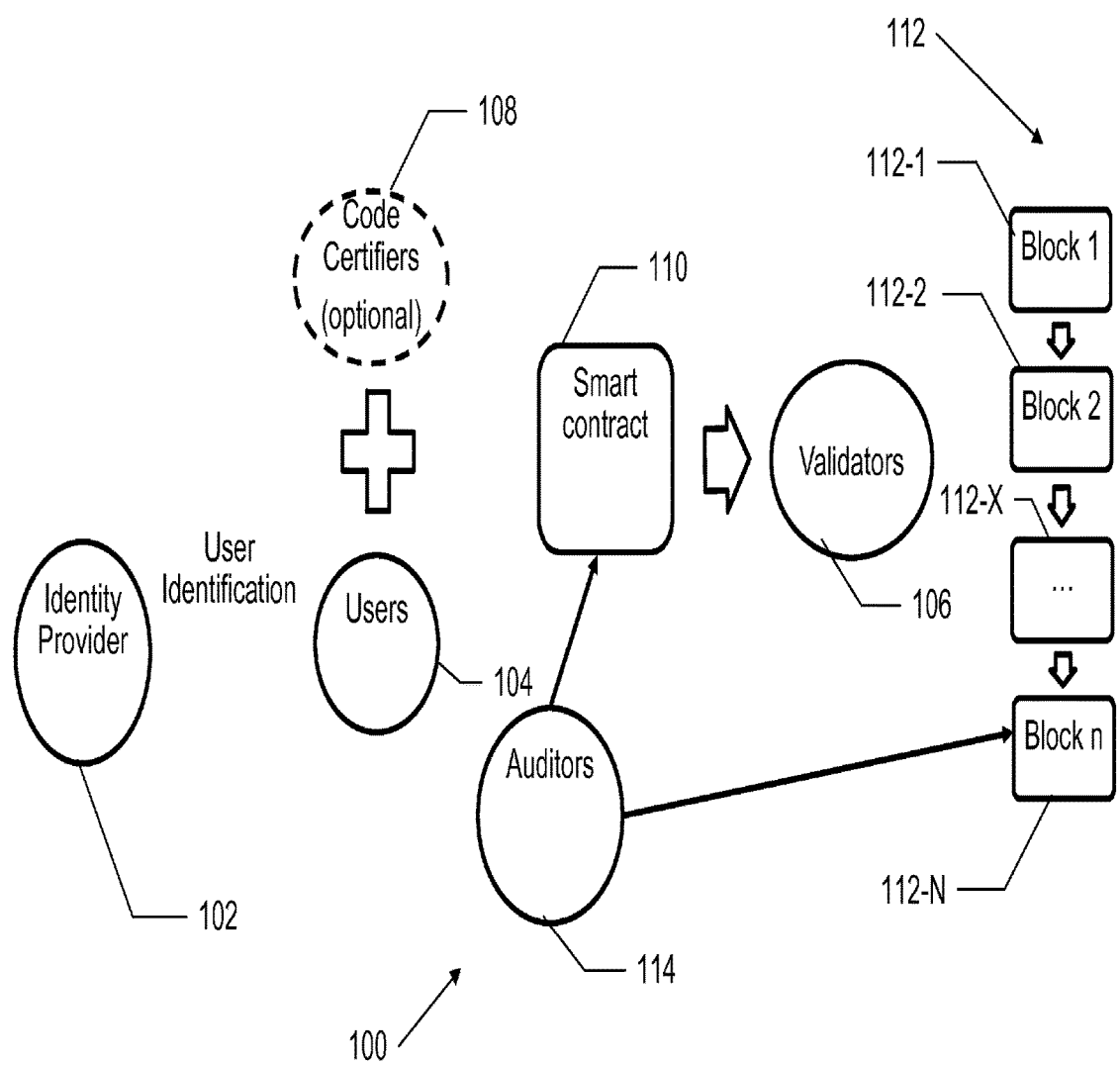
FIG. 3 is an exemplary process flow diagram of the invocation of a smart contract in the system shown in FIG. 1.

FIG. 3 shows an example of the invocation of a smart contract 110. User 104 may invoke a smart contract 110 function and may read the result.

A number of security properties may be implemented to ensure secure operation of system 100. For example, a smart contract 110 should be guaranteed to be executed correctly. A smart contract 110 function can only be invoked by parties (users 104 or validators 106) who are authorized to do so by that smart contract. Misbehaving users 104 can be detected and revoked from the system 100, thus providing accountability. Impersonation attacks should be prevented so that no user 104 is able to deny having created a transaction or having participated in a smart contract 110. Auditors 114 should be able to check any transaction they are legally authorized to access.

A number of privacy properties may be implemented to ensure private operation of system 100. For example, only the validators 106 specified by a smart contract 110 should be able to access or execute a confidential function of the smart contract, such as the ability to access cleartext code, to which user-transactions refer to a confidential function. Only the users 104 and validators 106 specified in a smart contract should be able to invoke a confidential portion of the smart contract. Transactions should not be linkable (identifiable) to the user 104 who produced the transaction or to the users 104 who can invoke the transaction unless this identifiability is authorized by the associated smart contract creator. Transactions of the same user should not be linkable unless this is authorized by the associated smart contract creator. The ability to link transactions may be conditional on proper user-behavior, and may be revoked for misbehaving users. Contract misbehavior by users may be detected by validators who may report it and provide proof of that user's misbehavior. The user may be indicated using their actual identity or using the user's pseudonym. When the user is identified by pseudonym, the identity provider/management system may identify the actual identity of the user whose pseudonym and/or private key misbehaved and make that user accountable. Access to private information may be granted by the associated smart contract creator selectively. Selective access to the smart contract and results, selective access to the participant user identities, and selective access to users' input (e.g., payment amount) may be provided.

The operation of system 100 does not depend on or require the proper operation or trustworthiness of all entities in the system. For example, entities may try to escalate their access rights, such as by trying to obtain the cleartext of a smart contract they are not authorized to access, and may impersonate other users or validators to do so. Users 104 may try to execute through the blockchain pieces of code they are not authorized to execute, they may try a Denial of Service (DoS) on the system 100 without being traced, they may try to impersonate or frame another user into a (malicious) act, and they may have access to other users' encrypted transactions. Validators 106 may try to disrupt the correctness of the transaction validation and execution, they may hide information from other users who are authorized to access that information. While not all validators are required to be trustworthy, proper operation of system 100 may still be provided as long as no more than a portion of validators (for example, ⅓) are untrustworthy. Validators may execute each contract (confidential or not). It also may be assumed in the threat model that users do not collude with validators. Code certifiers 108 are optional and may be a special part of validators, and may, for example, perform static or dynamic analysis of a piece of code. Auditors 114 are trusted to maintain the confidentiality of the contracts they are given access to Identity provider 102 is trusted to provide valid user identities to participant users, but may try to link transactions of the same user together.

In order to provide the above-mentioned security and privacy features, a transaction format and a set of protocols has been defined. The format and protocols allow contract creators at least the ability to specify a set of validators allowed to execute a smart contract, the conditions under which a result produced among the authorized (or contract) validators should be considered "valid", and a set of users who are allowed invoke the smart contract's functions. The format and protocols allow validators to identify transactions that correspond to smart contracts they are responsible for and to provide a "vote" for the result or invocation of a smart contract function of a transaction in a way that the validator is held accountable and without leaking the identity of the validator. The format and protocols allow participant users to invoke a smart contract function in an accountable way without a user's transactions being linked to the transaction that generated the smart contract or to other transactions of the user to unauthorized parties.

Figure 4:
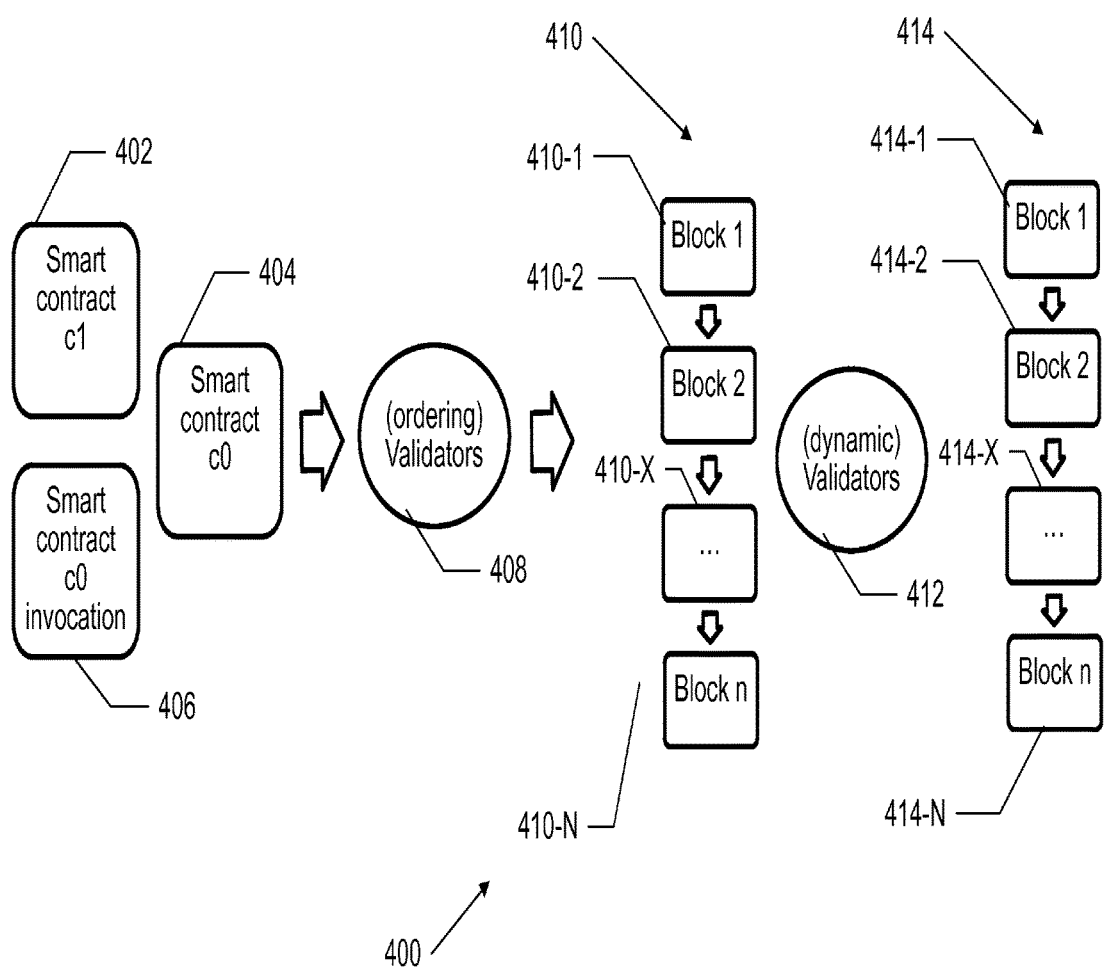
FIG. 4 is an exemplary data flow diagram of the operation of a Consensus Log/Ledger in the system shown in FIG. 1.

An exemplary data flow diagram of the operation of a Consensus Log+Ledger process 400 is shown in FIG. 4. In the example shown, smart contracts, such as smart contracts 402 and 404 are provided. At 406, a smart contract is invoked. Smart contracts 402, 404, and 406 are transmitted to validators at 408. The validators validate the smart contracts and generate a consensus log 410, which includes the total order of candidate transactions 410-1-410-N. Typically, validators do some static checks first. For example, validators may check whether the signatures on the transaction match the certificate/credential accompanying the transaction, and then add this transaction (collectively) to the consensus log. Further validators may execute the transaction one by one, a process also known as "validation". Consensus log 410 is the output of a consensus protocol among the validators. For example, the consensus protocol may be an atomic broadcast protocol, such as the Practical *Byzantine* Fault Tolerance (PBFT) protocol, etc. The transactions 410-1-410-N in consensus log 410 are submitted to validators at 412 for confidential validation. The output of the confidential validation 412 is ledger 414, which includes the total order of executed and valid transactions 414-1-414-N.

The process shown in FIG. 4 may use a number of credentials for the participating users and validators. For example, each user u may be equipped (for example, at registration time) with a (privacy-preserving) signature key pair ($spk_u$, $ssk_u$), where spk is signature public key, ssk is signature secret key, and u is user, and an encryption key pair ($epk_u$, $esk_u$), where epk is encryption public key, esk is encryption secret key, and u is user, through a (distributed) registration authority. For simplicity, the signature and encryption key pairs may be encapsulated in ($pk_u$, $sk_u$), where pk is public key, and sk is secret key, and u is user. Each validator v is equipped with a signature key pair ($spk_v$, $ssk_v$) and an encryption key pair ($epk_v$, $esk_v$), which for simplicity may be encapsulated in ($pk_v$, $sk_v$). Validator public keys are accessible to all entities in the system. Users can obtain the public information, such as the public keys of other users that are to participate in a contract through a dedicated Blockchain system entity, such as a subdivision of the registration authority. The public information may be obtained through out-of-band channels. For example, if two users know each other, they may exchange information through means that are not part of the system. As another example, other users may request that user's long term certificate/pk from the registration authority.

Figure 5:
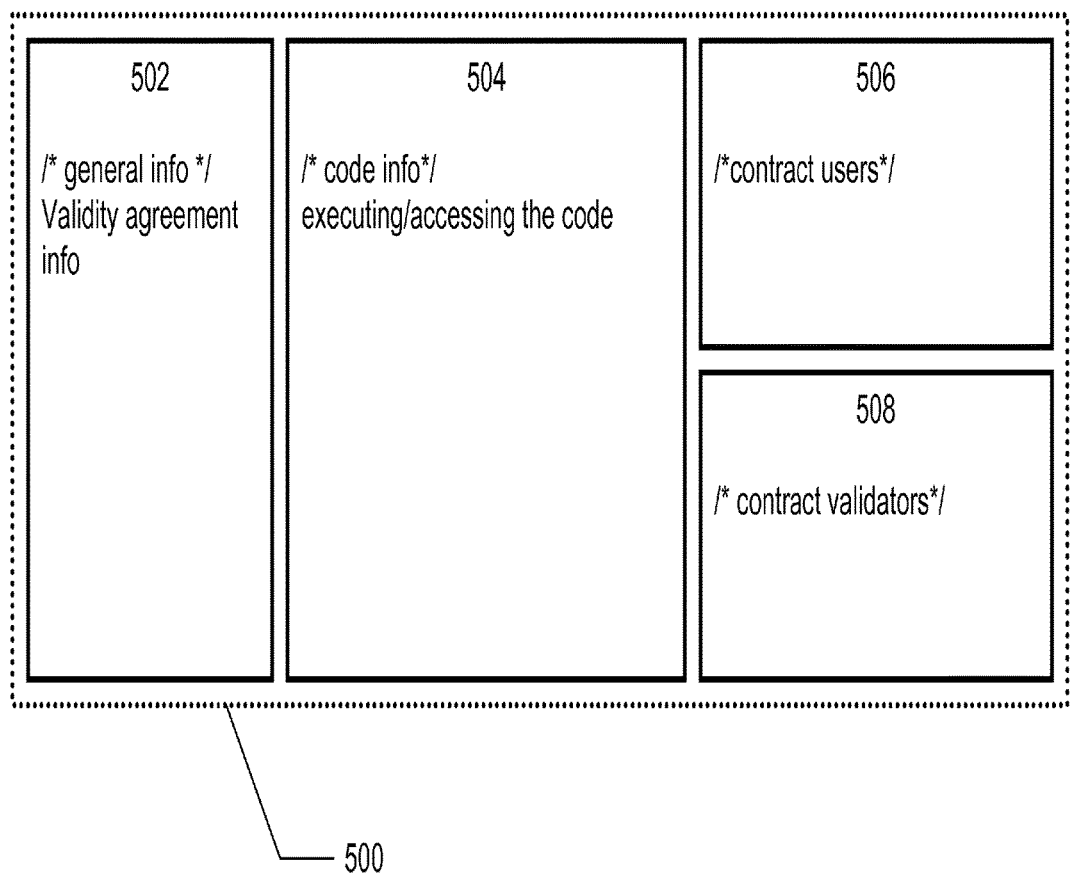
FIG. 5 is an exemplary transaction format that may be used for processing of a privacy-preserving smart contract.

An example of a transaction format 500 that may be used for processing of a privacy-preserving smart contract is shown in FIG. 5. In this example, transaction format 500 includes general information 502 accessible by any entity on the system—information on the transaction result agreement to be reached for the smart contract to be considered valid. Transaction format 500 includes confidential code information—the executable code 504 of the contract, which may be encrypted and which is accessible to entities with access or execution permission for the code, messages 506 to contract users, which is accessible to users of the contract, such as parties to a transaction, and messages 508 to contract validators, which is accessible to specified validators and may include privacy-preserving authentication information, such as pseudonyms of the validators. For example, validators may be required to prove their identities and may be given long-term certificates as a result, which they may use in conjunction with pseudonyms to preserve confidentiality of their identities. Users may use anonymous certificates, which allow the users to participate in transactions while preserving confidentiality of their identities.

Figure 6:
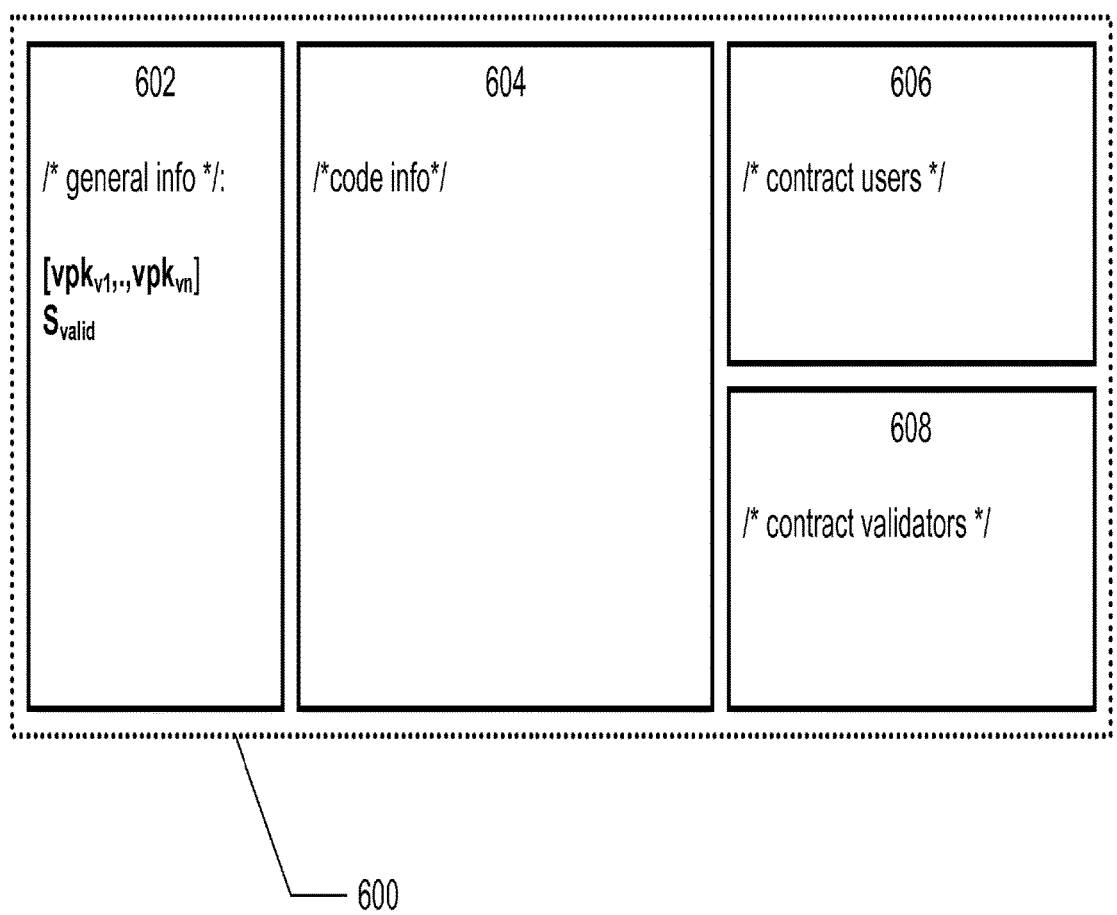
FIG. 6 is an exemplary transaction format that may be used for processing of a privacy-preserving smart contract.

An example of a transaction format 600 that may be used for processing of a privacy-preserving smart contract is shown in FIG. 6. As described above, transaction format 600 may include general information 602 accessible by any entity on the system—information on the transaction result agreement to be reached for the execution of the smart contract to be considered valid. This example does not depict the content of the secret message to validators, as the secret key may passed to validators through some secret channel between the user-validators, for example, as in BITCOIN®, where users communicate their pseudonyms with each other. Further, the result may be encrypted in a way such that if the plaintext is the same, then the ciphertext is the same. For example the creator may specify that results are encrypted using a particular key, and a specific IV. In this example, validators executing sensitive code may be concealed from the other parties. Information 602 may include $<S_{valid}, [vpk_{v1}, \ldots, vpk_{vn}]>$, where $S_{valid} \subseteq 2^V$ is a collection of sets of signatures from distinct validators, where one set in the collection is to be "collected" on the same contract result for the latter be considered valid. In this context, collected means to appear in the consensus log. Information 602 may include $\{vpk_{vi}\}_{i\ldots n}$, where vpk is validator public key and v is validator, which is a set of ephemeral public (signature) keys, one per validator.

This technique may be used if hiding the validator names is allowed. In some use-cases, hiding the validator names is not allowed, and there transactions should be followed by a list of certificates/PKs of validators that are responsible for executing a contract. Other techniques described herein may be applied to make contracts confidential to non-authorized validators and to enforce access control while guaranteeing unlinkability of user transactions, at least assuming the unlinkability/anonymity properties of the underlying membership services(identity management system).

Figure 7:
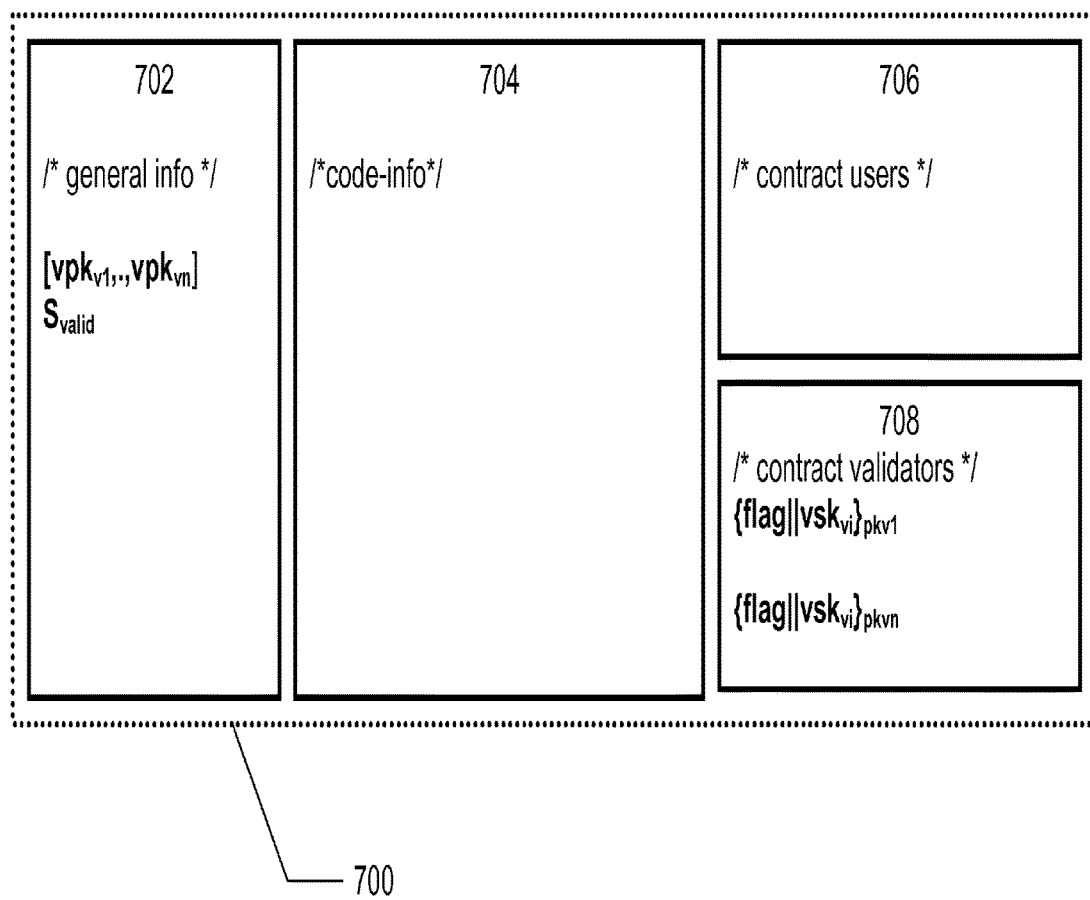
FIG. 7 is an exemplary transaction format that may be used for processing of a privacy-preserving smart contract.

An example of a transaction format 700 that may be used for processing of a privacy-preserving smart contract is shown in FIG. 7. As described above, transaction format 700 may include messages 708 to contract validators, which is accessible to specified validators and may include privacy-preserving authentication information. This is not needed if the long-term public keys of validators are used in the contract creation/invocation transaction. In this example, the secret keys used to authenticate validators are generated by the contract creator, and passed to validators through some secret channel such as a message encrypted with each validator public encryption key. Messages 708 may include corresponding signing keys, such as $vsk_{v1}$, where vsk is validator secret key and v is validator, encrypted with that validator's public key, $pk_{v1}$, through a per-validator message. In operation, each validator may attempt to decrypt each message. If a validator successfully decrypts a message, then that validator, and only that validator knows that the message was meant for them. The flag is a value known to all entities in the system.

A privacy-preserving smart contract transaction format may also include a confidential part. There are a number of degrees of smart contract confidentiality. For example, there may be public information that is visible to all entities in the system, there may be semi-public information that is visible to all smart contract participants, such as validators and users, there may be semi-private information that is visible only to validators, there may be private information that is visible to users of the contract only, there may be user-private information that is visible to a participant of the contract and not to everyone, there may be validator-private information that is visible to a validator of the contract and not to everyone, etc. Confidential information may protect the actual code to be executed, participant user identities and participant user input, and smart contract validators' identities. Confidentiality may be achieved through assignment of (ephemeral) authentication tokens to user participants, for example, for user-input, assignment of (ephemeral) authentication tokens to validators, for example, for smart contract result agreement, and assignment of (ephemeral) authentication tokens to roles (if any), or access control lists for invoking contract functions, throughout the smart contract execution or invocation, for example, for contract creator or user-inputs. Contract (executable) code may be encrypted using a symmetric key $K_c$ that is accessible to contract validators $V_c$, contract users Uc, and auditors (for example, identified by $pk_{audit}$). This provides the ability to leverage (anonymous) multi-cast encryption (for small/non-known groups) by $[code]_{Kc} \| \{msg_{u/V/audit}\}_{for\ all\ u/V\ in\ Uc/Vc}$, where $msg_{V/u/audit} = [flag, K_c]_{pkv/pku/pkaudit}$, code is smart contract code, H is a collision resistant hash function, and flag is a public value. For large or pre-fixed groups, group encryption may be leverages, such as anonymous attribute based encryption.

Figure 8:
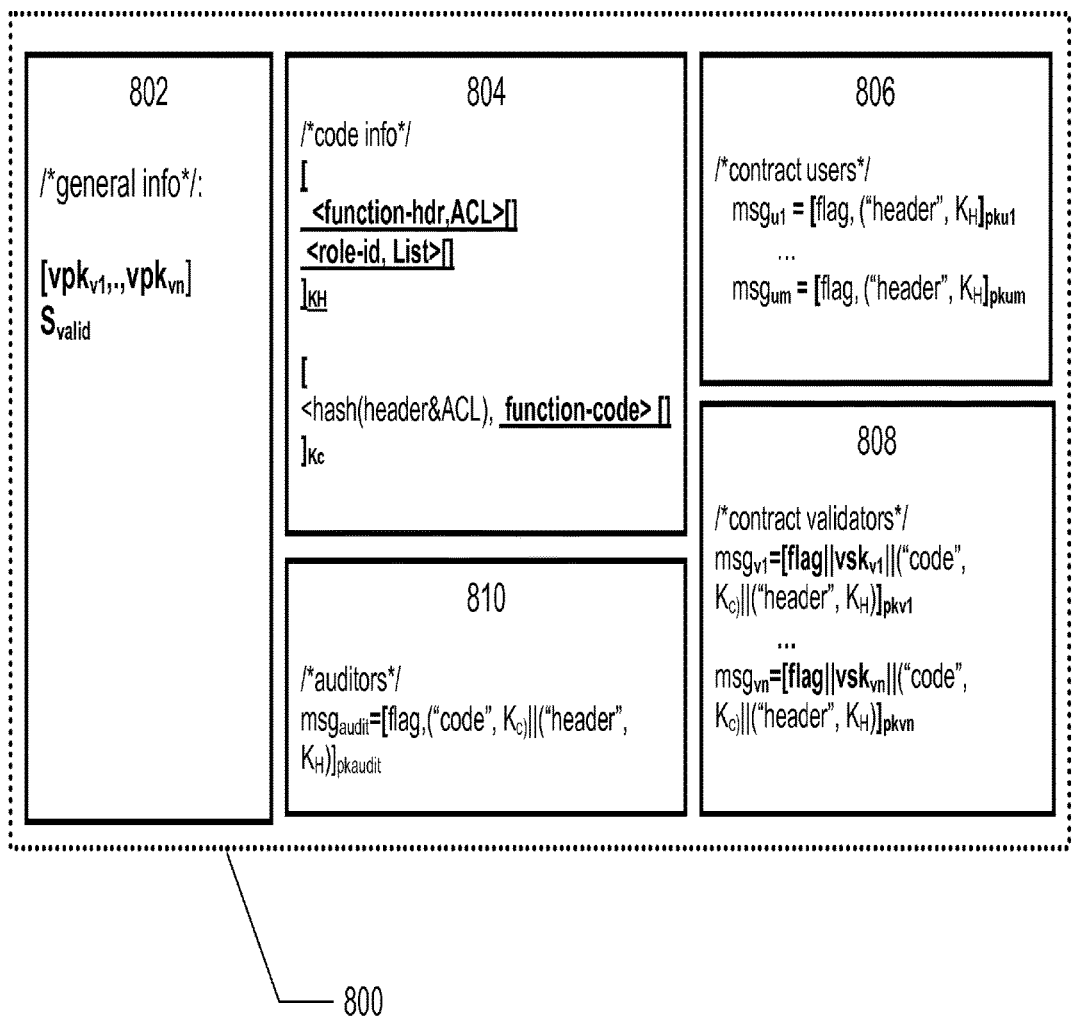
FIG. 8 is an exemplary transaction format that may be used for processing of a privacy-preserving smart contract.

An example of a transaction format 800 that may be used for processing of a privacy-preserving smart contract is shown in FIG. 8. The labels "header", "code", etc., correspond to the use of each key provided to the users/contracts. A contract may include a number of functions. Each function has its own access control list (ACL), essentially the private keys of the contract users. The associated secret keys are given to the contract users through the section 806, "/*contract users*/". A header function is a description of what the function does, and how it should be invoked. Roles may contain the roles as before associated with a list of user public identifiers. In this example, confidential information may include, the /*code info*/ 804, which is accessible to entities with access or execution permission for the code, messages 806 to users, such as $msg_{u1}=[flag, ("header", K_H]_{pku1} \ldots msg_{um}=[flag, ("header", K_H]_{pkum}$, which is accessible to users of the contract, messages 808 to validators, such as $msg_{v1}=[flag\|vsk_{v1}\|("code", K_c)\|("header", K_H)]_{pkv1} \ldots msg_{vn}=[flag\|vsk_{vn}\|("code", K_c)\|("header", K_H)]_{pkvn}$, which is accessible to specified validators and may include privacy-preserving authentication information, and messages 810 to auditors, such as $msg_{audit}=[flag,("code", K_c)\|("header", K_H)]_{pkaudit}$. The header and ACL may correspond to the set of headers and ACLs included in the ciphertext shown. The executable code of the contract may be encrypted using, for example, a symmetric key $K_c$ that is accessible to contract validators $V_c$, of size n, contract users $U_c$, of size m, and auditors (e.g., identified by $pk_{audit}$).

A number of different types of authentication may be utilized by the present system, method, and computer program product. For example, authentication may be used to authorize a contract, for example, as by someone who is part of the system, to authorize users to invoke smart contract functions, and for (dynamic) validators participating in a smart contract execution and result validation. Authentication of the contract may include verifying that a chainode or smart contract invocation was generated by a valid user. The identities of users or validators who create contracts may be concealed, as could privacy-preserving signatures that could be instantiated, such as ($spk_u$, $ssk_u$). Such signatures may be issued at user registration time (this can also be part of the ledger). The signer may be hidden in the set of valid users, but known only to the signature system manager. A signature system manager may be used to facilitate operation. The signature system manager may be a central authority, such as may be operated by all stakeholders jointly, or the signature system manager may be distributed, such as to leverage one group manager per stakeholder (leverage hierarchical forms of "group" signatures).

Figure 9:
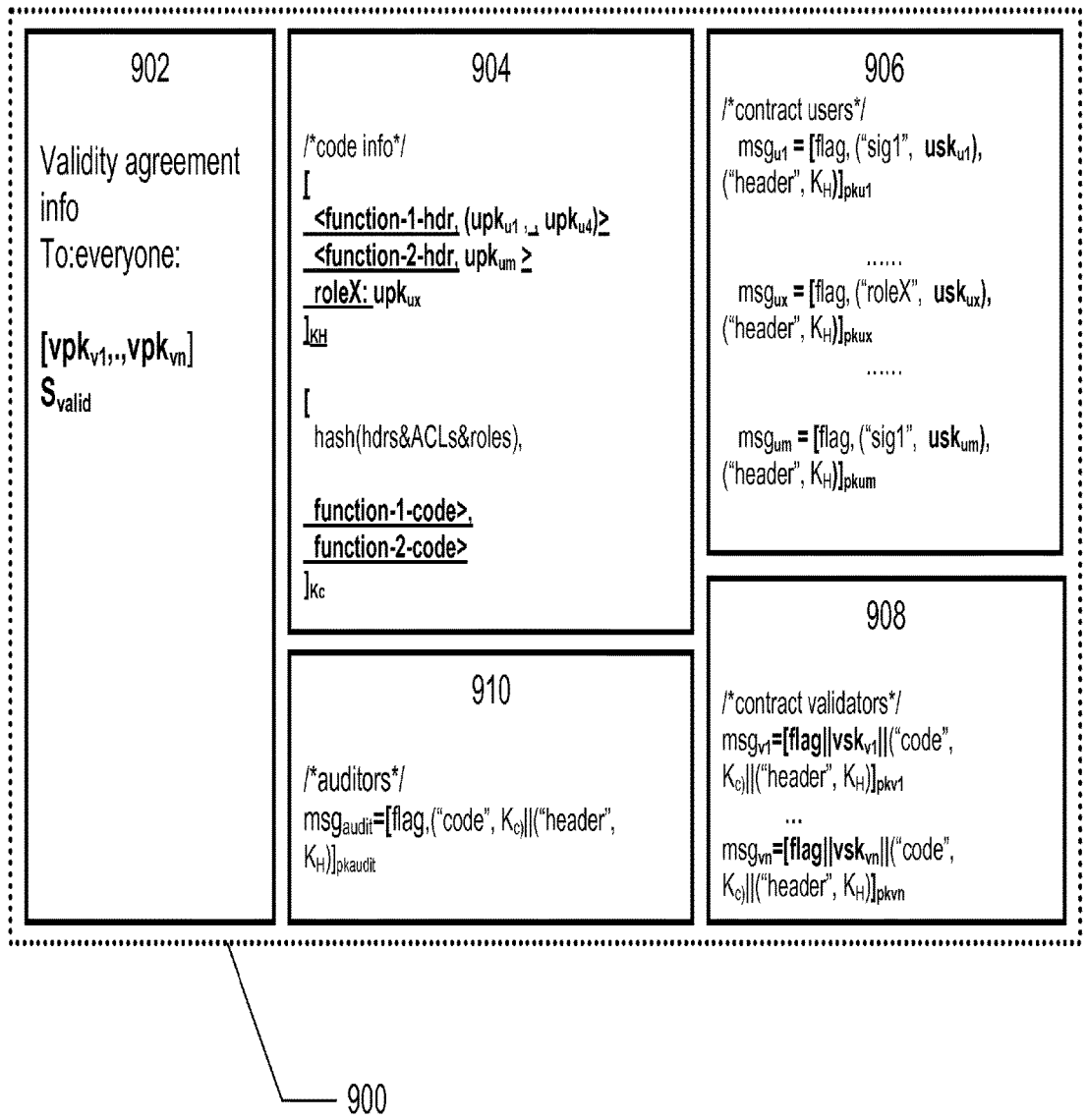
FIG. 9 is an exemplary transaction format illustrating user authentication.

For example, a transaction format 900 illustrating authentication of a user as authorized to invoke a method in the contract specified in the current transaction is shown in FIG. 9. In this example, information to authenticate contract user roles and assign authentication tokens to user participants is shown. Validators may know how to evaluate user input and user authorization to invoke a function related to a contract without knowing participant user identities. The contract creator generates a new temporary signature (/encryption) key pair per contract user, ($upk_u$, $usk_u$), which may be used as pseudonyms for the users. The user public key, upku, is added in the executable code 904 of the contract, such as [<function-1-hdr, ($upk_{u1}$, $upk_{u4}$)> <function-2-hdr, $upk_{um}$>roleX: $upk_{ux}]_{KH}$ to identify the participating users and their roles. The user secret key, $usk_u$, is added to the corresponding per-contract-user messages 806, such as $msg_{u1}$=[flag, ("sig1", $usk_{u1}$), ("header", $K_H$)]$_{pku1}$, to allow the selected users to determine their roles. This example illustrates a technique that allows invocation of a contract only by a subset of users in such a way that the privacy provisions of the underlying identity management system are not violated. That is, these users can remain anonymous (to the public validators and potentially to the authorized ones), and these user transactions are unlinkable by the public validators as having originated by the same user. At the same time, unauthorized users may not be able to invoke a contract.

Figure 10:
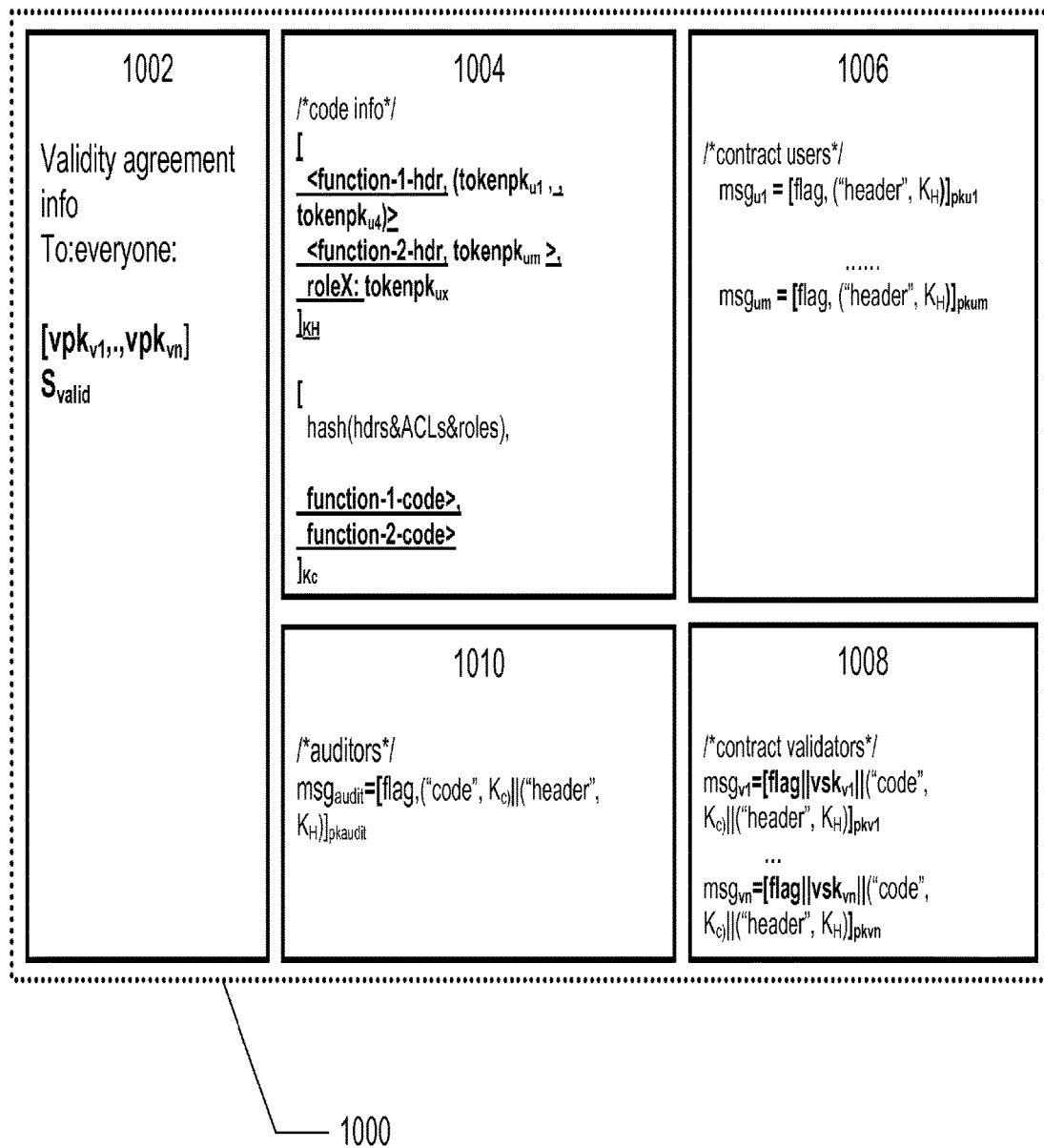
FIG. 10 is an exemplary transaction format that may be used for user authentication.

In another example of a transaction format 1000 used for authentication of a user as authorized to invoke a method in the contract specified in the current transaction, shown in FIG. 10, tokens could be provided by a certified (anonymous) key pair issued by an attribute authority. In this example, the executable code 1004 of the contract includes public key tokens and the messages to users 1006 need not include the user secret keys.

Figure 11:
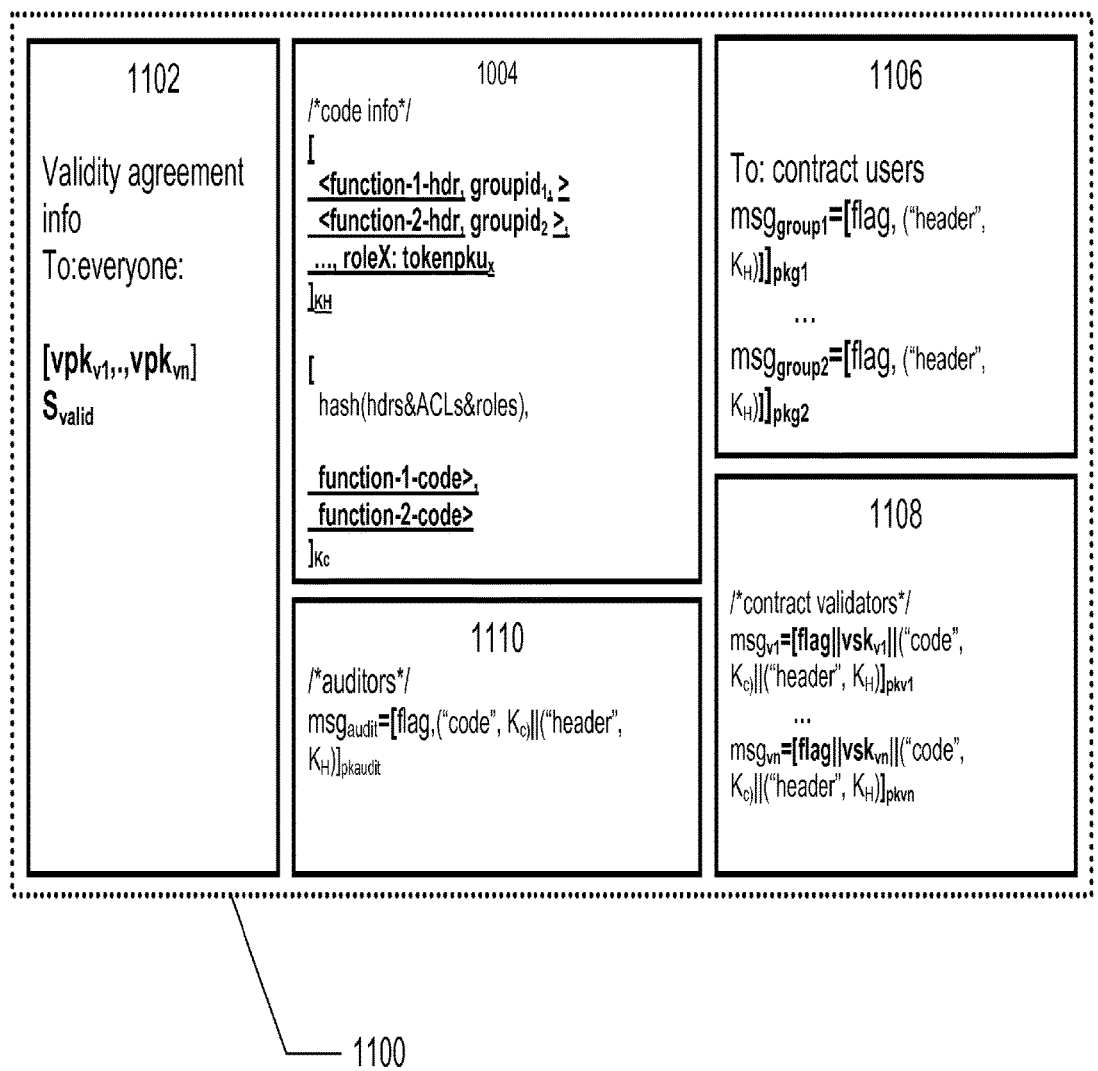
FIG. 11 is an exemplary contract deployment transaction format accommodating user authentication for successive contract invocations.

In another example of a contract deployment transaction format 1100 accommodating authentication of a user as authorized to invoke a method in the contract specified in the current transaction, shown in FIG. 11. This is not an example of invocation transaction, but is an exemplary design for a transaction defining a contract, such that future transactions invoking that contract can be properly authenticated. Through this (contract deployment) transaction the creator of the contract provides information that validators can use when the contract is invoked (through an invocation transaction) to authenticate the user as one who has access to invoking that contract's function(s). The tokens could be provided by an existing group that is defined either through the means of identity provider attributes or through another smart contract. In this example, the executable code 1104 of the contract includes public key tokens includes the groupid of the group. The groupids may be included in the contract providing the capability to add or subtract group members independently of the contracts. The corresponding group (identified through that group id) may be defined through another contract in the Blockchain. The may provide the capability to have many contracts aimed to the same group of users that may be changing often. Each group may be referred to in multiple contracts, and each contract may reference multiple groups.

Figure 12:
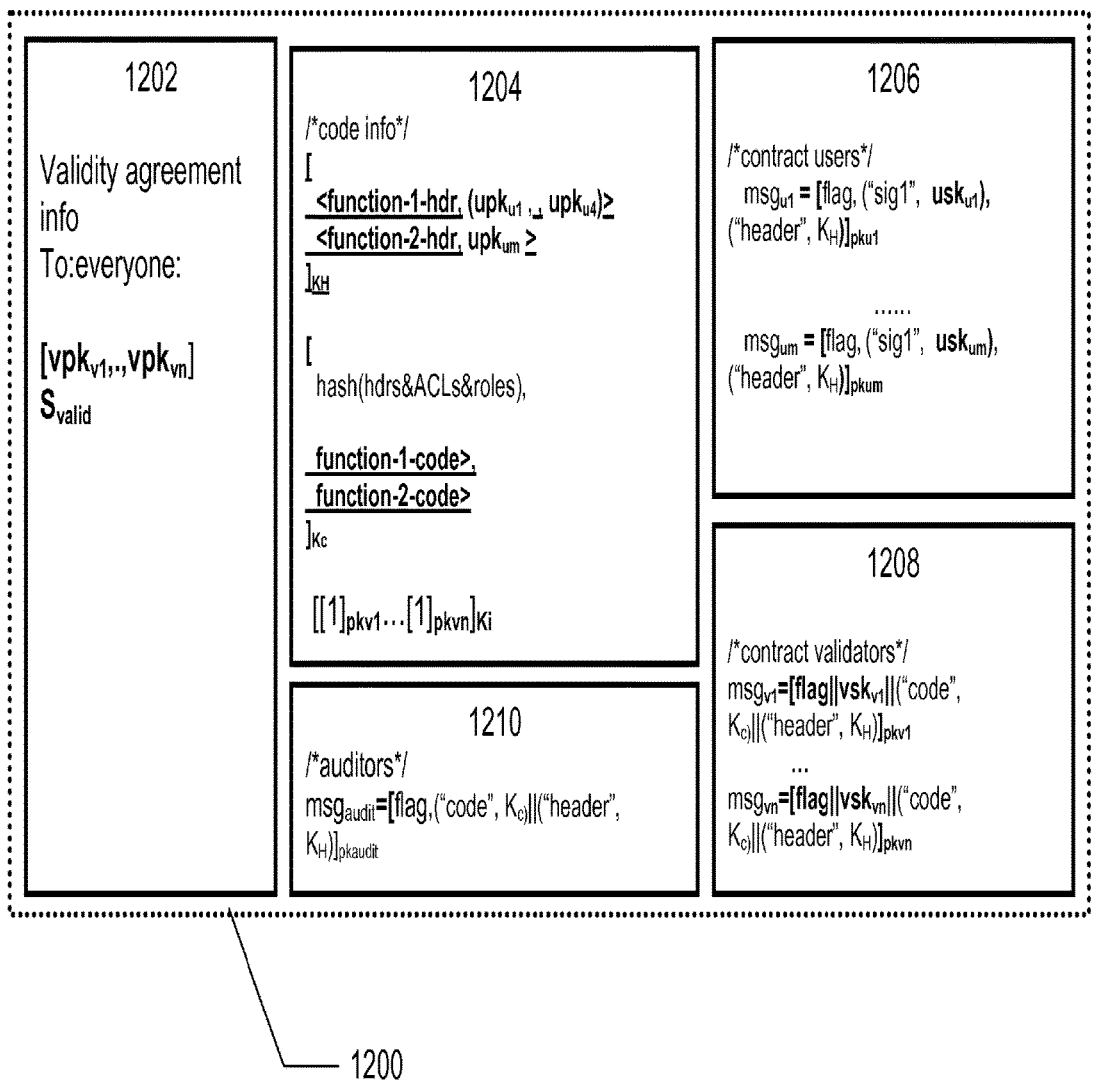
FIG. 12 is an exemplary contract deployment transaction format accommodating invocation unlinkability by attaching special unlinkability metadata.

For example, an exemplary contract deployment transaction format 1200 accommodating invocation unlinkability is shown in FIG. 12. This is not an example of invocation transaction, but is an exemplary design for a transaction defining a contract, such that future transactions invoking that contract can be unlinkable. In this example, information to enable authorized users to unlinkably invoke a function of an existing chain-code is shown. Supporting unlinkability of contract invocation transaction to the current transaction, such as the transaction that describes and defines the contract for a first time. The transaction format may contain information that would enable the invokers to make unlinkable validators' pseudonyms and/or to provide encrypted information to validators without knowing the identities of the validators. Thus, the users don't know the identities of the validators, although the contract creator may. The contract creator gives the validators keys, such as in message 1208, $msg_{v1}$=[flag||$vsk_{v1}$||("code", $K_c$)||("header", $K_H$)]$_{pkv1}$ . . . $msg_{vn}$=[flag||$vsk_{vn}$||("code", $K_c$)||("header", $K_H$)]$_{pkvn}$. Unlinkability of long term validator keys (vsk) provides the capability for invokers to pass messages to authorized validators using their long term keys without knowing participant validator identities. The information may, due to homomorphism of the underlying encryption scheme, be used for users to (i) encrypt messages of their choice under validator keys they are not aware of, and (ii) make ciphertexts unlinkable to look different though they contain the same message. Further, it provides the capability to define new ephemeral public keys for validators without them being linked to the original chain-code, while giving access to it to the chain-code creator in a verifiable way. This allows a user to make unlinkable validator keys, vpks, without any help. However, the user may need to pass the unlinkability information to the validators, so that they may check the well-formedness of the transaction. Accordingly, this information allows the user to pass unlinkability information to the validators secretly. Thus, access may be given or denied based on access to the keys. The keys may be homomorphic, which allows invokers to encrypt using the keys without knowing whose key is being used, and thus, to whom the information is being sent. Accordingly, an encryption scheme in which the ciphertexts do not leak the recipient identity, can be made unlinkable, and are homomorphic would be suitable. Also, commitment values may enforce committing and authenticated encryption could be used.

Figure 13:
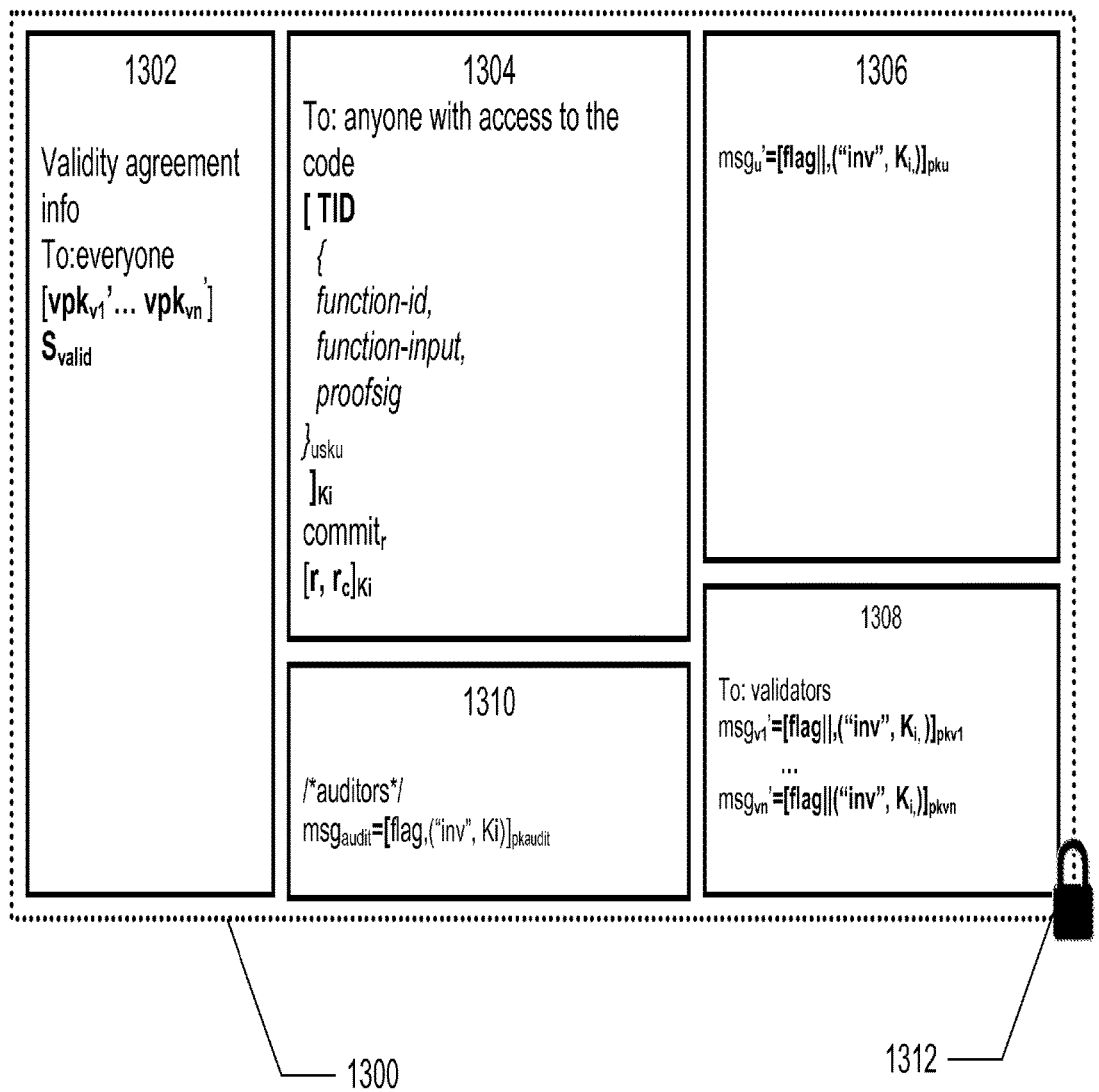
FIG. 13 is an exemplary invocation transaction format illustrating unlinkability to the associated contract deployment transaction (by illustrating the use of the unlinkability information).

Invokers may use the unlinkability information to pass messages (keys to encrypt the code body), to the chain-code validators efficiently, for example, with the validators only needing to use their long-term public keys. This unlinkability information may be used so that a validator may be able to double-check that the other contract validators' keys were properly made unlinkable. For example, as shown in FIG. 13, messages to validators 1308 may include information such as $msg_{v1}$'=[flag||,("inv", $K_i$)]$_{pkv1}$. Messages to anyone with access to the code 1304 may be signed with the usku, which is the secret key that is associated to the role or ACL that user corresponds to. Invokers may use the unlinkable nature of the pseudonym keys of validators to define new temporary keys that remain unlinkable to the original validator keys. For example, for randomly chosen r, $vpk_{vi}' \leftarrow (vpk_{vi})^r$, for i=1 . . . n (all public keys raised to a selected value) may be computed. Invokers may commit to all the messages they have been passing through encryption such that message encryption is undeniable, i.e., $commit_r \leftarrow pedCommit(r)$, where random $r_c$ is used. Accordingly, all validators may be verified to ensure that only contract creators may choose validators and that users may not choose validators. PedCommit denotes the Pedersen commitment on number r using randomness r_c. Also, the dotted line around the boxes denotes signature of this transaction using the user's privacy-preserving (membership service) signing key 1312, which is the ssku.

Operation of the system, method, and computer program product will be described in the context of an exemplary application, such as an auctioning service. In this example, the participants include the auctioning service, which is the creator of the smart contract, represented as ($pk_S$, $sk_S$) (private key, service, secret key, service), a first user, user A, represented by $pk_A$ ($sk_A$) (private key, A, secret key, A), and a second user, user B represented by $pk_B$ ($sk_B$) (private key, B, secret key, B). In this example, the auctioning service allows A and B to compete using secret bids, from which the lowest bid wins. Validation is provided by, and restricted to, validators V1, V2, V3 represented by $pk_{V1/V2/V3}$. Requirements of the smart contract defining the auctioning service are that the contract is confidential to everyone apart from V1, V2, V3, A's bids are confidential to everyone apart from V1, V2, V3, and B's bids are confidential to everyone apart from V1, V2, V3. Functions provided by the smart contract are deposit and auction.

Figure 14:
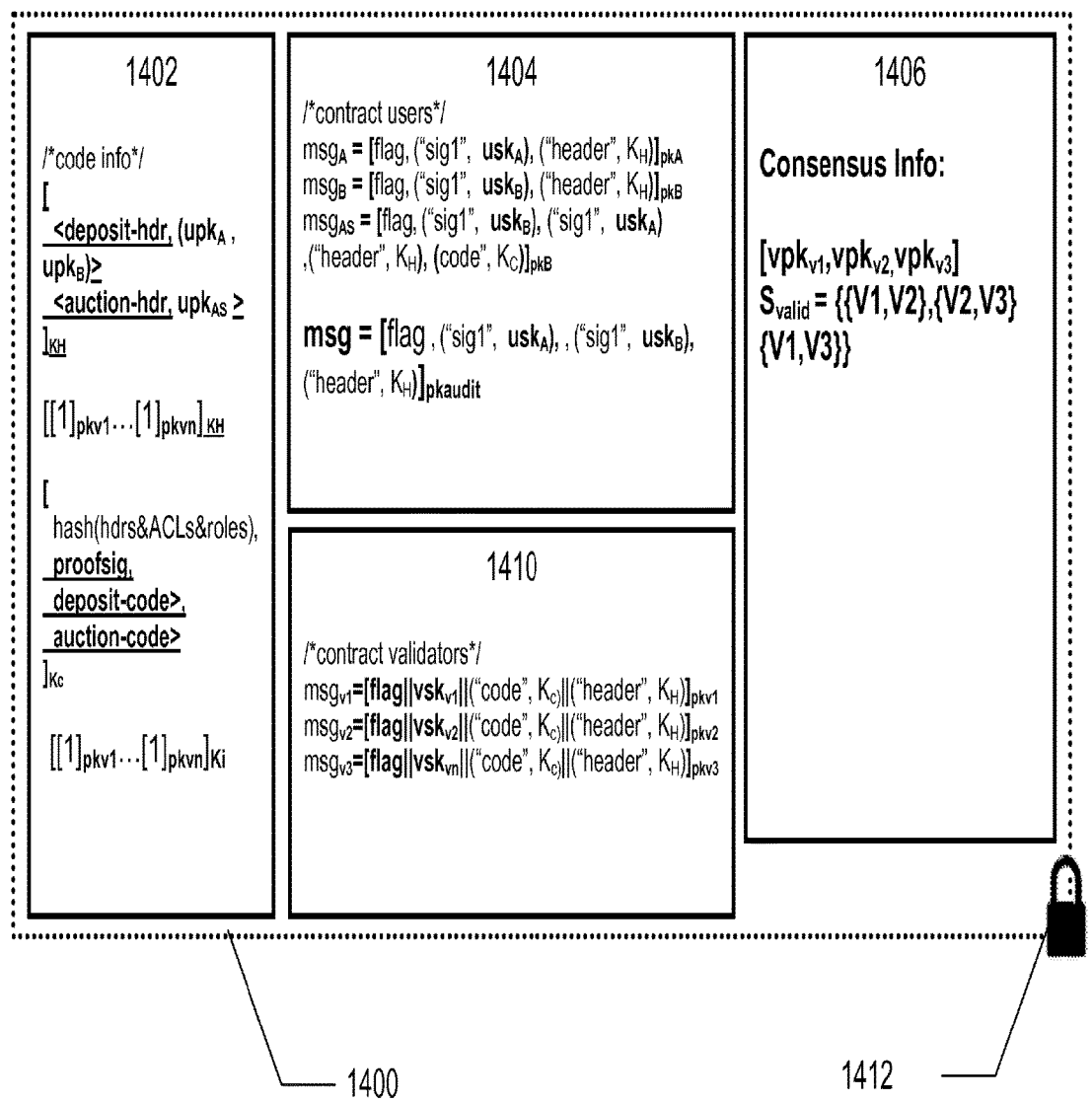
FIG. 14 is an exemplary format of a smart contract implementing the deployment of an exemplary auctioning service.

An exemplary format of a smart contract implementing this exemplary auctioning service is shown in FIG. 14. The contract users are specified in 1404 by a message to user A ($msg_A$=[flag,$K_c$,$usk_A$]$_{pkA}$, signed with the public key of A), a message to user B ($msg_B$=[flag,$K_c$,$usk_B$]$_{pkB}$, signed with the public key of B). Msg_AS in 1404 denotes a message to the user called "auctioning service" that is deploying the auctioning service. The auditors are also specified in 1404 with a message (msg=[flag,$K_c$,$K_{Audit}$,$usk_B$]$_{pkaudit}$, signed with the public key of the auditors). The code and access to the code is specified in 1402 ([code, H(code) [{part1→$upk_A$}]$_{KR}$ [{part2→$upk_B$}]$_{KR}$ [Audit Info]$_{Kaudit}$]$_{Kc}$, including code for the users and information for the auditors). The validators are specified in 1410 ($msg_{v1}$={flag||$vsk_{v1}$||$K_c$||$K_R$}$_{pkv1}$, $msg_{v2}$={flag||$vsk_{v2}$||$K_c$||$K_R$}$_{pkv2}$, $msg_{v3}$={flag||$vsk_{v3}$||$K_c$||$K_R$}$_{pkv3}$, signed with the public keys of the validators). The consensus criteria, which specify the combinations of validators that have to find the transaction valid in order for the transaction to be found valid, are specified in 1406. In this example, any two validators must find the transaction valid in order for the transaction to be found valid. The contract is signed 1412 using the auctioning service signing key, $ssk_S$, which is the signature of the creator of the code and that would be linkable to the service only by the signature system manager. The service is returned a transaction ID, TID. The contract is then transmitted to the validators.

The validators V1, V2, V3 receive the smart contract, and check the signature 1412. Since there is nothing for the validators to execute, they generate a response by encrypting "null" with $K_R$ into a smart contract specific transaction as follows: resV1/2/3←TID, [null]$_{KR}$, where TID is the transaction ID of the advertised smart contract, and 1412 is the signature over the corresponding verifier key, i.e., $sk_{v1/2/3}$, $vsk_{v1/2/3}$. The validators then release their response to the network.

The validator response messages are included in the consensus log. Validators check the signature of at least 2 messages in the consensus log (cardinality of sets in $S_{valid}$) for a TID that have the same result, and consider the result "null" as valid. As the contract has now been validated, smart contract and the corresponding (deterministically encrypted) result is added to the ledger.

Figure 15:
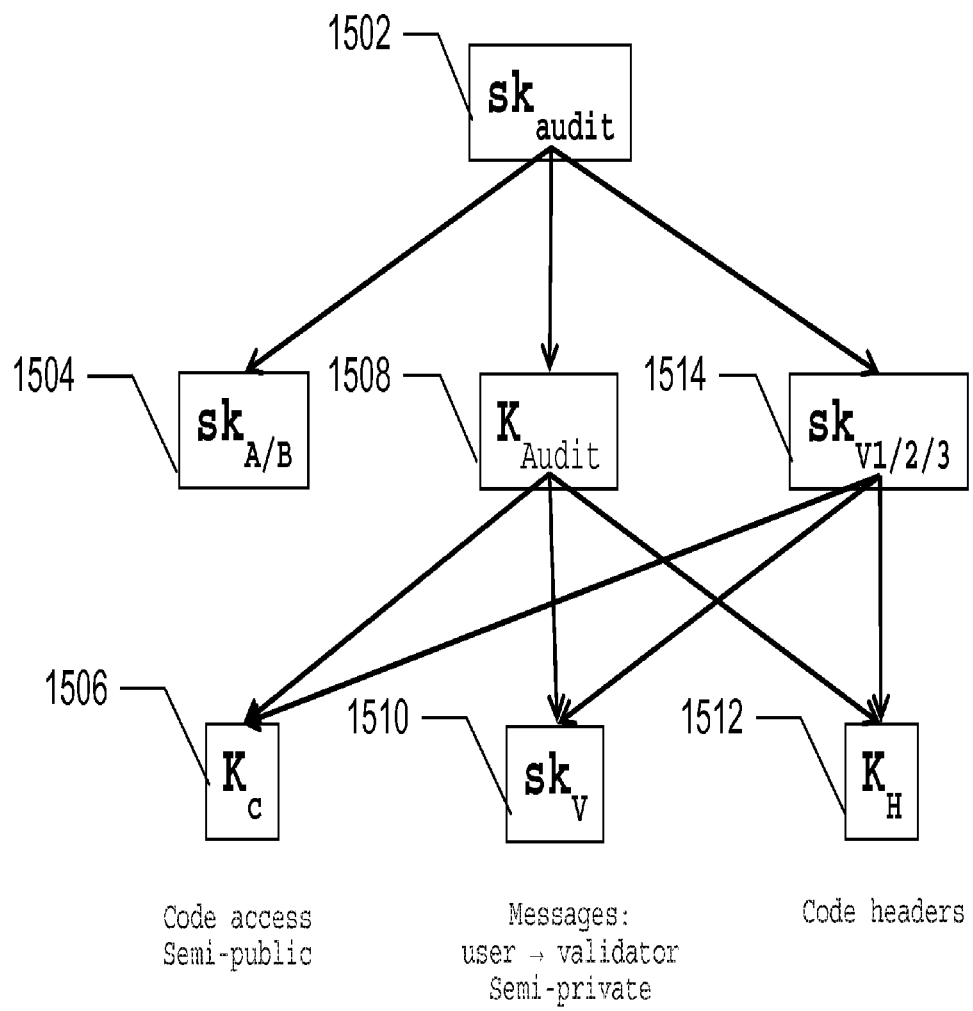
FIG. 15 is an exemplary diagram showing an exemplary key hierarchy that could apply for the exemplary auctioning service.

An example of a key hierarchy in the auctioning service example is shown in FIG. 15. As shown in this example, the auditors, possessing the auditor secret key 1502, $sk_{audit}$, have access to all lower level information. This auditor key may be shared with one or more entities. Code access is semi-public and granted to the users A and B, possessing the user secret keys 1504, $sk_{A/B}$, which give access to the contract code 1506, $K_c$ and potential results of its (e.g., if we assume that results are encrypting using the same code-specific key. Messages from user to validator are semi-private and are accessible by the auditors 1508, $K_{Audit}$ and each validator with their respective validator secret key 1510, $sk_V$ (although 1510 is optional). Alternatively, a key dedicated to results and code state could be added in the key hierarchy, such as, $K_R$ that would be the code results and state information accessible to all validators using their validator secret keys 1514, $sk_{V1/2/3}$. The additional key Kr may be added for encrypting results, although in this example, the results are encrypted using Kc. Code headers 1512 are accessible to all validators using their validator secret keys 1514, $sk_{V1/2/3}$, and users using their secret keys $sk_{A/B}$.

Figure 16:
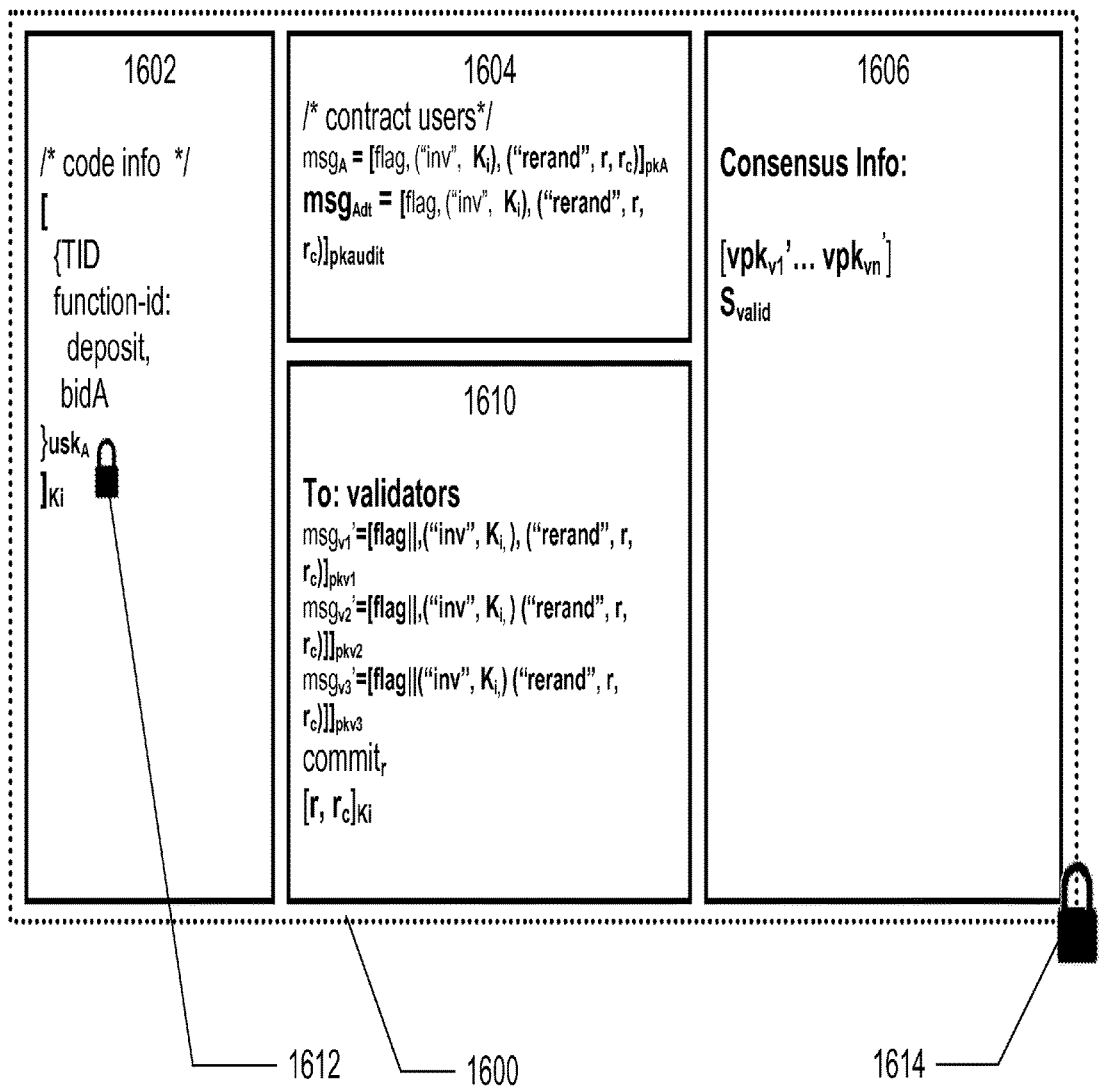
FIG. 16 is an exemplary transaction format for invoking a contract that may be used in the exemplary auctioning service.

An exemplary format of a transaction 1600 for invoking a contract in the exemplary auctioning service is shown in FIG. 16. In this example, invocation of the deposit function is shown. In this example, user A prepares a bid (bidA) as shown. The code 1602 includes the bid and the entire message TID/Function-id-deposit is signed by the user secret key, $usk_A$, a key generated by the creator for a first user that has been assigned to and is accessible only to user A. The user secret key, $usk_A$, signs the information inside the ciphertext in 1602, as shown by 1612. The entire message is signed by user A's user's membership service key/credential, $ssk_A$, that would be linkable to the service only by the manager. The message may also include some proof that usku1/A and the key corresponding to the external signature is of the same user, such as the one who performs the internal signature knows the secret key of the external signature as well (proofsig). This is to avoid mix and matching attacks, where the adversary wants to claim the creation of a contract.

Figure 17:
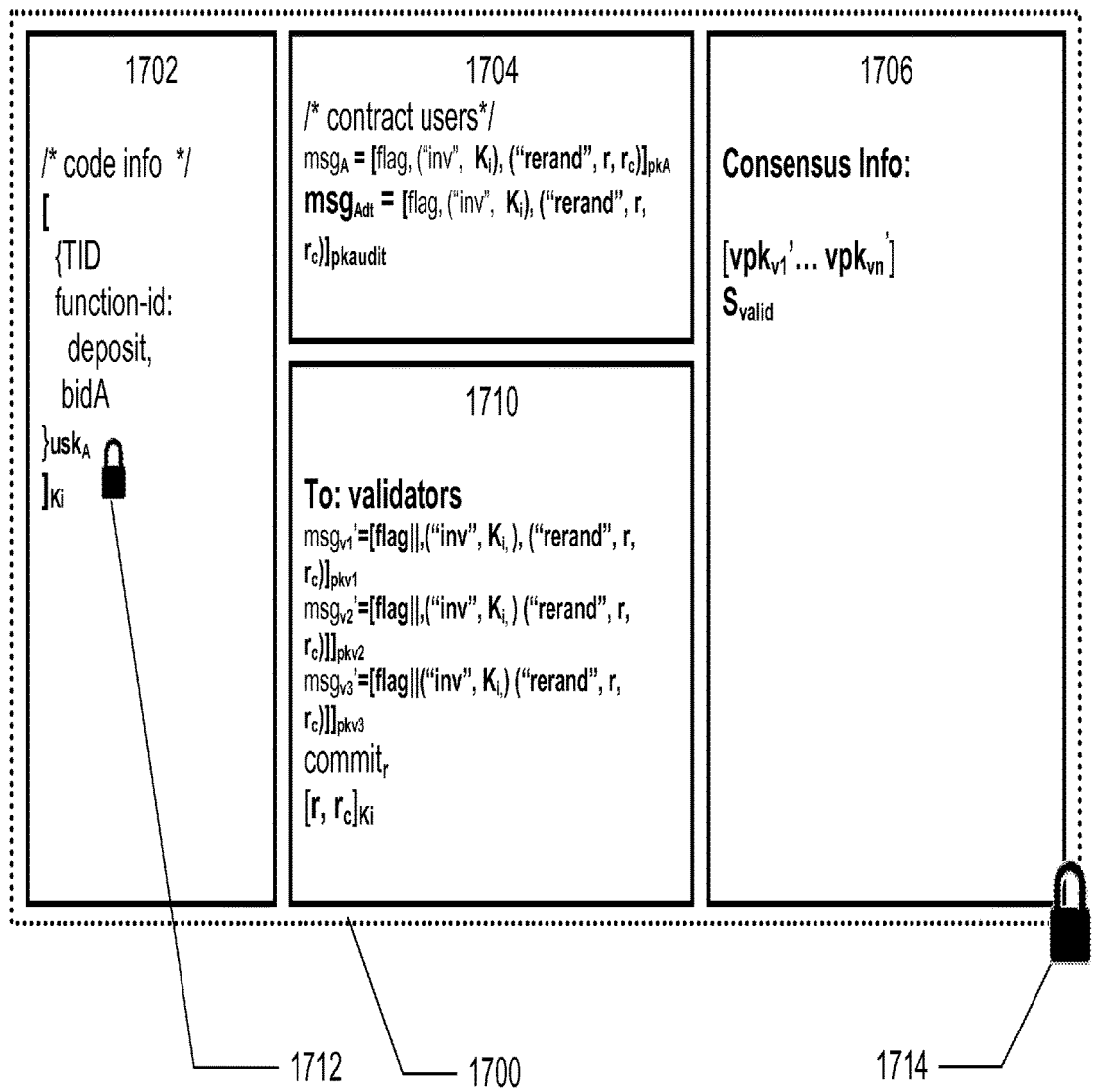
FIG. 17 is an exemplary format of a transaction implementing the exemplary auctioning service.

This transaction is released to the network and receives a transaction ID, TID. The validators receive the transaction and determine that it is for them. However, none of the validators can link this transaction to the contract creation transaction. The validators encapsulate bidA with $K_R$ (as this is now the result) and keep it in their record. This transaction is released to the network and receives a transaction ID, TID, and its result is included in the ledger. Inside the encrypted (and signed with usku1/A item) on the left, could potentially be added An exemplary format of a transaction 1700 implementing the exemplary auctioning service invoking the auction function is shown in FIG. 17. In this example, user A prepares a function call on the auctioning service as shown. The code 1702 includes the function call and is signed by the user secret key, $usk_A$, a key generated by the creator for a first user that has been assigned to and is accessible only to user A, as shown by 1712. The entire message is signed by user A's credential, $ssk_A$, as shown by 1714, which would be linkable to the service only by the manager. This transaction is released to the network and receives a transaction ID, TID'. The validators receive the transaction and determine that it is for them. However, none of the validators can link this transaction to the contract creation transaction. The validators determine and agree on the winner of the auction as the result. The result is in the form of $upk_A/upk_B$, which identifies the winner, but not in a way that can be linked back by other entities. This transaction is released to the network and receives a transaction ID, TID', and its result is included in the ledger.

As a further example, if the format of $ssk_A$ allows for it, it can be that the user offers a proof of common ownership of $ssk_A$, and $usk_A$ inside the encrypted part of the transaction. For example if $usk_A$. $ssk_A$ are ElGamal keys, the difference between the two s keys could be included in the encrypted part of the code. Given the external group-membership related signature, the validators would be able to assess whether the signing key of this signature belongs to the same user as the role-key ($usk_A$).

As additional examples, the Transaction ID may be computed as the hash of the smart contract ciphertext. References from a transaction to another transaction (e.g., a transaction invoking the code having created in another transaction) may be concealed by leveraging unlinkable encryption schemes that could be used for validators' PKI. A smart contract may invoke another by leveraging distributed cryptography. A contract creator may be distributing secret shares of a special "user participant" signature key of the invoking smart contract. Signature of the (dynamic) validators as mentioned above may also be applied on top of the share distribution. Undeniability of the encryption is important to ensure that what the auditor "sees", is what the other users/validators "see". Further, committing encryption is important to ensure that, given the result of a decryption process, an entity should know if the plaintext is valid or it has been given the wrong key. This way of building privacy-preserving code approach may be generalized for nested pieces of confidential code, where each layer has a different set of authorized (or contract) validators. The auditor obtains access to the mapping between user keys and participant user keys, as well as from validator keys and authorized (or contract) validator keys. Validators may organize the ledger using the hashes of ciphertext (as TID). To speed up the validation process, authorized (or contract) validators may also maintain the TIDs that are referenced among transactions.

An exemplary block diagram of a computer system 1800, in which the processes involved in the system, method, and computer program product described herein may be implemented, is shown in FIG. 18. Computer system 1800 is typically a programmed general-purpose computer system, such as a personal computer, workstation, server system, and minicomputer or mainframe computer. Computer system 1800 may include one or more processors (CPUs) 1802A-1802N, input/output circuitry 1804, network adapter 1806, and memory 1808. CPUs 1802A-1802N execute program instructions in order to carry out the functions of the present invention. Typically, CPUs 1802A-1802N are one or more microprocessors, such as an INTEL PENTIUM® processor. FIG. 18 illustrates an embodiment in which computer system 1800 is implemented as a single multi-processor computer system, in which multiple processors 1802A-1802N share system resources, such as memory 1808, input/output circuitry 1804, and network adapter 1806. However, the present invention also contemplates embodiments in which computer system 1800 is implemented as a plurality of networked computer systems, which may be single-processor computer systems, multi-processor computer systems, or a mix thereof.

Input/output circuitry 1804 provides the capability to input data to, or output data from, computer system 1800. For example, input/output circuitry may include input devices, such as keyboards, mice, touchpads, trackballs, scanners, etc., output devices, such as video adapters, monitors, printers, etc., and input/output devices, such as, modems, etc. Network adapter 1806 interfaces device 1800 with a network 1810. Network 1810 may be any public or proprietary LAN or WAN, including, but not limited to the Internet.

Memory 1808 stores program instructions that are executed by, and data that are used and processed by, CPU 1802 to perform the functions of computer system 1800. Memory 1808 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1808 varies depending upon the function that computer system 1800 is programmed to perform. For example, as shown in FIG. 1, computer systems may perform a variety of roles in the system, method, and computer program product described herein. For example, computer systems may perform one or more roles as users, validators, auditors, and/or identity providers. In the example shown in FIG. 18, exemplary memory contents are shown representing routines for all of these roles. However, one of skill in the art would recognize that these routines, along with the memory contents related to those routines, may be included on one system, or may be distributed among a plurality of systems, based on well-known engineering considerations. The present invention contemplates any and all such arrangements.

In the example shown in FIG. 18, memory 1808 may include user routines 1810, validator routines 1812, auditor routines 1814, identity provider routines 1816, smart contracts 1818, ledger/consensus log 1822, and operating system 1824. User routines 1810 may include routines to implement functions utilized by end-user computer systems, such as appearing to create, submit, and provide input to a smart contract. Validator routines 1812 may include routines to implement functions utilized by validator computer systems, such as verifying (i.e., executing) a contract, generating result information, and eventually including it in the ledger. Auditor routines 1814 may include routines to implement functions utilized by auditor computer systems, such as at any point checking what contracts have taken place, and their content. Identity provider routines 1816 may include routines to implement functions utilized by identity provider computer systems, such as identity provisioning for the users and validators. Smart contracts/transactions 1818 may include data and software code to implement actions or functions to be performed for, or by connected or associated systems and/or messages for smart contract invocation. Ledger/consensus log 1822 may include data such as an ordered log of candidate transactions (potentially containing invalid ones) and/or validated transactions. Operating system 1824 provides overall system functionality.

As shown in FIG. 18, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while aspects of the present invention have been described in the context of a fully functioning data processing system, those of ordinary skill in the art will appreciate that the processes of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and, flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of processing digital transactions in a network of computer systems comprising:
   creating a digital message associated with a privacy-preserving smart contract, said digital message including:
      at least one function associated with a digital transaction;
      computer program instructions that, when executed by at least one processor of a computer system, cause the at least one processor to perform said at least one function relating to said digital transaction, wherein the computer program instructions are encrypted by a symmetric key, the symmetric key providing anonymous multi-cast encryption so that only validator computer systems in a specified set of validator computer systems and only user computer systems in a specified set of user computer systems have access to the computer program instructions;
      a specification of the set of validator computer systems to validate the computer program instructions and results of execution of the computer program instructions, each validator computer system having a public key and secret key pair and being associated with a blockchain network, wherein the symmetric key is generated based on the public keys of the set of validator computer systems; and
      a specification of the set of user computer systems to be parties to the digital transaction, each user computer system having a public key and secret key pair, wherein the symmetric key is generated based on public keys of each computer system of the set of validator computer systems; and
      each function of said at least one function specifying an execution role for a subset of user computer systems for executing the function without revealing the identity of corresponding users;
   signing the digital message using a private key of a creator of the digital message;
   transmitting the digital message over the network to at least the specified set of validator computer systems; and
   receiving validation results from at least two validator computer systems of the specified set of validator computer systems, wherein the validation results are generated at a validator computer system by:
      decrypting the signed digital message using a public key of the creator of the digital message;
      decrypting the computer program instructions using the validator computer system's secret key;
      executing the computer program instructions in the digital message using the at least one processor;
      determining, based on the execution of the computer program instructions, whether the computer program instructions are valid; and
      generating the validation result indicating whether the computer program instructions are valid;
   determining that at least a threshold number of validation results received from the at least two validator computer systems indicates that the digital message is valid; and
   determining that the digital message is valid based on the determination that at least the threshold number of validation results indicate that the computer program instructions are valid; and
   adding the digital message to a ledger of the blockchain network in response to determining that the digital message is valid.

2. The method of claim 1, wherein the specified validator computer systems do not have access to identities of the specified user computer systems.

3. The method of claim 1, wherein the generation of the validation results at the validator computer system further comprises encrypting the validation results so that only authorized parties can see the result.

4. The method of claim 3, wherein the encryption of the validation results at the validator computer system comprises signing the validation results with the symmetric key.

5. A system for processing digital transactions in a network of computer systems, the system comprising at least one hardware processor configured to
create a digital message associated with a privacy-preserving smart contract, said digital message including:
at least one function associated with a digital transaction;
computer program instructions that, when executed by at least one processor associated with a computer system, cause the at least one processor to perform said at least one function relating to the digital transaction, wherein the computer program instructions are encrypted by a symmetric key, the symmetric key providing anonymous multi-cast encryption so that only validator computer systems in a specified set of validator computer systems and only user computer systems in a specified set of user computer systems have access to the computer program instructions;
a specification of the set of validator computer systems to validate the computer program instructions and results of execution of the computer program instructions, each validator computer system having a public key and secret key pair and being associated with a blockchain network, wherein the symmetric key is generated based on the public keys of the set of validator computer systems; and
a specification of the set of user computer systems to be parties to the digital transaction, each user computer system having a public key and secret key pair, wherein the symmetric key is generated based on public keys of each computer system of the set of validator computer systems; and
each function of said at least one function specifying an execution role for a subset of user computer systems for executing the function without revealing the identity of corresponding users;
sign the digital message using a private key of a creator of the digital message;
transmit the digital message over the network to at least the specified set of validator computer systems; and
receive validation results from at least two validator computer systems of the specified set of validator computer systems, wherein the validation results are generated at a validator computer system by:
decrypting the signed digital message using a public key of the creator of the digital message;
decrypting the computer program instructions using the validator computer system's secret key;
executing the computer program instructions in the digital message using the at least one processor;
determining, based on the execution of the computer program instructions, whether the computer program instructions are valid; and
generating the validation result indicating whether the computer program instructions are valid;
determine that at least a threshold number of validation results received from the at least two validator computer systems indicates that the digital message is valid; and
determine that the digital message is valid based on the determination that at least the threshold number of validation results indicate that the computer program instructions are valid; and
add the digital message to a ledger of the blockchain network in response to determining that the digital message is valid.

6. The system of claim 5, wherein the specified validator computer systems do not have access to identities of the specified user computer systems.

7. The system of claim 5, wherein the generation of the validation results at the validator computer system further comprises encrypting the validation results so that only authorized parties can see the result.

8. The system of claim 7, wherein the encryption of the validation results at the validator computer system comprises signing the validation results with the symmetric key.

9. A computer program product for processing digital transactions in a network of computer systems, the computer program product comprising a non-transitory computer readable medium and computer program instructions stored on the non-transitory computer readable medium, the computer program instructions, when executed by at least one processor, configuring the at least one processor to:
create a digital message associated with a privacy-preserving smart contract, said digital message including:
at least one function associated with a digital transaction;
computer program instructions that, when executed by at least one processor associated with a computer system, cause the at least one processor to perform said at least one function relating to the digital transaction, wherein the computer program instructions are encrypted by a symmetric key, the symmetric key providing anonymous multi-cast encryption so that only validator computer systems in a specified set of validator computer systems and only user computer systems in a specified set of user computer systems have access to the computer program instructions;
a specification of the set of validator computer systems to validate the computer program instructions and results of execution of the computer program instructions, each validator computer system having a public key and secret key pair and being associated with a blockchain network, wherein the symmetric key is generated based on the public keys of the set of validator computer systems; and
a specification of the set of user computer systems to be parties to the digital transaction, each user computer system having a public key and secret key pair, wherein the symmetric key is generated based on public keys of each computer system of the set of validator computer systems; and
each function of said at least one function specifying an execution role for a subset of user computer systems for executing the function without revealing the identity of corresponding users;
sign the digital message using a private key of a creator of the digital message;
transmit the digital message over the network to at least the specified set of validator computer systems; and
receive validation results from at least two validator computer systems of the specified set of validator computer systems, wherein the validation results are generated at a validator computer system by:
decrypting the signed digital message using a public key of the creator of the digital message;
decrypting the computer program instructions using the validator computer system's secret key;

executing the computer program instructions in the digital message using the at least one processor;
determining, based on the execution of the computer program instructions, whether the computer program instructions are valid; and
generating the validation result indicating whether the computer program instructions are valid;
determine that at least a threshold number of validation results received from the at least two validator computer systems indicates that the digital message is valid; and
determine that the digital message is valid based on the determination that at least the threshold number of validation results indicate that the computer program instructions are valid; and
add the digital message to a ledger of the blockchain network in response to determining that the digital message is valid.

10. The computer program product of claim 9, wherein the specified validator computer systems do not have access to identities of the specified user computer systems.

11. The computer program product of claim 9, wherein the generation of the validation results at the validator computer system further comprises encrypting the validation results so that only authorized parties can see the result.

12. The computer program product of claim 11, wherein the encryption of the validation results at the validator computer system comprises signing the validation results with the symmetric key.

13. The method of claim 1, further comprising:
authenticating a user role to invoke a function by creating, for the specified set of user computer systems to be parties to the digital transaction, a temporary encryption key pair per smart contract user, said temporary encryption key pair comprising: a user public key provided with said function, and a user secret key added to a corresponding per-contract-user message provided with said digital message.

14. The method of claim 1, further comprising:
authenticating a user role to invoke a function by issuing, for the specified set of user computer systems to be parties to the digital transaction, a public key token provided with each said at least one function in said digital message.

15. The system of claim 5, wherein the digital message further comprises:
a temporary encryption key pair per smart contract user of a specified set of user computer systems to be parties to the digital transaction, said temporary encryption key pair comprising: a user public key provided with said at least one function, and a user secret key added to a corresponding per-contract-user message provided with said digital message, said temporary encryption key pair for authenticating a user to invoke said at least one function.

16. The system of claim 5, wherein the digital message further comprises:
a public key token for use by a smart contract user of a specified set of user computer systems to be parties to the digital transaction, said public key token provided with said at least one function in said digital message for authenticating a user role to invoke said function.

17. The computer program product of claim 9, further comprising:
authenticating a user role by creating, for the specified set of user computer systems to be parties to the digital transaction, a temporary encryption key pair per smart contract user, said temporary encryption key pair comprising: a user public key provided with said at least one function, and a user secret key added to a corresponding per-contract-user message provided with said digital message.

18. The computer program product of claim 9, further comprising:
authenticating a user role to invoke a function by issuing, for the specified set of user computer systems to be parties to the digital transaction, a public key token provided with each said at least one function in said digital message.

19. The method of claim 1, wherein each function of said at least one function specifying an access control list identifying a subset of user computer systems for executing the function without revealing the identity of the corresponding users.

20. The computer program product of claim 9, wherein each function of said at least one function specifying an access control list identifying a subset of user computer systems for executing the function without revealing the identity of the corresponding users.

* * * * *